(12) United States Patent
de Haan

(10) Patent No.: US 9,272,744 B1
(45) Date of Patent: Mar. 1, 2016

(54) THREE-WHEELED VEHICLES

(71) Applicant: Peter de Haan, Bend, OR (US)

(72) Inventor: Peter de Haan, Bend, OR (US)

( * ) Notice: Subject to any disclaimer, the term of this patent is extended or adjusted under 35 U.S.C. 154(b) by 0 days.

(21) Appl. No.: 14/930,431

(22) Filed: Nov. 2, 2015

Related U.S. Application Data

(63) Continuation of application No. 14/569,546, filed on Dec. 12, 2014, now Pat. No. 9,221,508.

(51) Int. Cl.
*B62D 61/06* (2006.01)
*B60N 2/005* (2006.01)

(52) U.S. Cl.
CPC .............. *B62D 61/065* (2013.01); *B60N 2/005* (2013.01)

(58) Field of Classification Search
CPC ........ B62D 61/065; B62D 61/06; B62K 5/05; B60N 2/00; B60N 2/005
USPC .............................. 180/215, 211, 210; 280/62
See application file for complete search history.

(56) References Cited

U.S. PATENT DOCUMENTS

| | | | |
|---|---|---|---|
| 1,164,310 A | 12/1915 | Nilson | |
| 1,989,995 A * | 2/1935 | Martin | B62D 61/065 180/210 |
| 2,066,666 A | 1/1937 | Becker | |
| 2,101,057 A | 12/1937 | Fuller | |
| 2,377,389 A | 6/1945 | Waters | |
| 2,434,759 A * | 1/1948 | Donovan | B62D 61/065 180/210 |
| 2,620,612 A | 12/1952 | Lewis | |
| 2,818,127 A | 12/1957 | Mason | |
| 3,419,098 A * | 12/1968 | Mayers | B62D 61/065 180/11 |
| 3,610,358 A * | 10/1971 | Korff | B62D 61/065 180/11 |
| 4,162,605 A * | 7/1979 | Olin | B62D 61/065 180/211 |
| 4,320,810 A * | 3/1982 | Hillmann | B62D 9/00 180/6.3 |
| 4,336,964 A | 6/1982 | Pivar | |
| 4,351,410 A | 9/1982 | Townsend | |
| 4,377,215 A * | 3/1983 | Hare | B60G 9/027 180/21 |
| 4,410,198 A | 10/1983 | Fernandes et al. | |
| 4,606,429 A | 8/1986 | Kurata | |
| 4,625,825 A | 12/1986 | Ethier | |
| 4,662,468 A | 5/1987 | Ethier | |
| 4,703,824 A | 11/1987 | Irimajiri et al. | |
| 4,919,225 A * | 4/1990 | Sturges | B62D 61/08 180/210 |
| D336,452 S * | 6/1993 | Holm-Rasmussen | D12/128 |
| 5,236,060 A | 8/1993 | Huber | |
| 5,248,011 A | 9/1993 | Richards | |
| 5,343,973 A * | 9/1994 | Lanker | B62D 61/065 180/211 |
| 5,431,243 A | 7/1995 | Richards | |
| 5,806,622 A * | 9/1998 | Murphy | B60J 5/02 180/210 |

(Continued)

FOREIGN PATENT DOCUMENTS

JP 02109751 A * 4/1990 ............... B60N 2/00

OTHER PUBLICATIONS

Neil, D., "A Test Drive of the Death-Trap Car Designed by Buckminster Fuller," The Wall Street Journal, Apr. 24, 2015.

(Continued)

*Primary Examiner* — Keith Frisby
(74) *Attorney, Agent, or Firm* — Leber Patent Law P.C.

(57) ABSTRACT

The present disclosure relates to three-wheeled vehicles. The three-wheeled vehicles disclosed herein are characterized by two front wheels and a single rear wheel, an engine located rearward of the cockpit and a drivetrain configured to power the front wheels. Three-wheeled vehicle configurations in accordance with the present disclosure may enhance various handling characteristics of the vehicle.

26 Claims, 9 Drawing Sheets

(56) References Cited

U.S. PATENT DOCUMENTS

| | | | |
|---|---|---|---|
| 5,947,222 A * | 9/1999 | Yamaoka | B62D 61/06 180/210 |
| 7,143,853 B1 | 12/2006 | Mercier et al. | |
| 7,464,781 B2 | 12/2008 | Guay | |
| 7,588,110 B2 | 9/2009 | Martino | |
| 7,648,148 B1 | 1/2010 | Mercier | |
| 8,061,465 B2 | 11/2011 | Martino | |
| 8,544,587 B2 | 10/2013 | Holroyd | |
| 8,695,746 B2 | 4/2014 | Holroyd | |
| 2005/0225477 A1 | 10/2005 | Cong et al. | |
| 2007/0215398 A1 | 9/2007 | Ferdows | |
| 2011/0209521 A1 | 9/2011 | Shiozawa et al. | |
| 2013/0319784 A1 | 12/2013 | Kennedy | |
| 2014/0025246 A1 | 1/2014 | Hall | |

OTHER PUBLICATIONS

"Dan Neil: Dymaxion Car-Cool How Does it Drive?," The Wall Street Journal, Apr. 24, 2015, video available at http://www.wsj.com/video/dan-neil-dymaxion-carcool-how-does-it-drive/2B013063-CA7B-4AAA-95D1-1565F9EF4F65.html.

"Rolling a Reliant Robin," Top Gear, Season 15, Episode 1, BBC, Jun. 19, 2010, video available at https://www.youtube.com/watch?v=QQh56geU0X8.

2013 Dodge Dart Commercial "How to Change Cars Forever," Jul. 2012, video available at https://www.youtube.com/watch?v=sZ_qZSGadhs.

Transcript of 2013 Dodge Dart Commercial "How to Change Cars Forever," Jul. 2012.

Kong, Benson, "The Hypercar Blueprint," http://www.motortrend.com/features.performance/1308_hypercar_blueprint/viewall.html, Aug. 2013, 19 pages.

Handley, Jake, "Lucas Ordonez Enjoys 'Interesting' Zeod Test", 24 Hours of Le Mans—The Checkered Flag, http://www.thecheckeredflag.co.uk/2014/04/lucas-ordonez-enjoys-interesting-zeod-test/, Apr. 24, 2014, 5 pages.

"Toyota TF109 Seen with X-Ray Vision", http://www.ausmotive.com/2010/07/16/toyota-tf109-seen-with-x-ray-vision.html, Posted in Formula 1, Toyota, Jul. 16, 2010, 6 pages.

Winkler, C.B. et al., "Center of Gravity Height: A Round-Robin Measurement Program", The University of Michigan, Transportation Research Institute, Technical Report Document No. UMTRI-91-4, Jan. 1991, pp. 1-68.

Terry, B., "Understeer and Oversteer", HighGear, RMR.PCA.ORG, May 2014, pp. 1-11.

Hathaway, R., "Steer Angles, Ackerman and Tire Slip Angles", 'Tech 04, H&S Prototype and Design, LLC, pp. 1-12, publication date unknown.

Heydinger, Gary J. et al., "Measured Vehicle Inertial Parameters—NHTSA's Data Through Nov. 1998", Society of Automotive Engineers, Inc., 1999, pp. 1-33.

"Rear-Engine, Front-Wheel-Drive-Layout", retrieved from http://en.wikipedia.org/w/index.php?title=Rear-engine,_front-wheel-drive_layout&oldid=545503032, pp. 1-2, last modified Mar. 19, 2013.

Ortiz, M., "Polar Moment of Inertia", Racecar Engineering, vol. 22, No. 2, Feb. 2012, pp. 33-34.

Fenner, Patrick, "On the Golden Rule of Trike Design", Deferred Procrastination Co., Oct. 4, 2010, pp. 1-9.

"Handling Characteristics of Road Vehicles", http://www.thecartech.com/subjects/auto.eng2/Handling_characteristics_of_road_vehicles.htm, downloaded Dec. 8, 2014, pp. 1-16.

Alberghl, S. et al., "Is It More Thrilling to Ride at the Front of the Back of a Roller Coaster?", The Physics Teacher, vol. 45, Dec. 2007, pp. 536-541.

Starr, Patrick J., "Designing Stable Three Wheeled Vehicles, With Application to Solar Powered Racing Cars", University of Minnesota Solar Vehicle Project, Nov. 8, 2006, pp. 1-22.

Crolla, D., "Vehicle Dynamics, Control and Suspensions", Chapter 7—Handling-Fundamentals, Department of Mechanical Engineering, U.K., University of Leeds, 2003, pp. 1-24.

* cited by examiner

THREE-WHEELED VEHICLES

RELATED APPLICATIONS

This application is a continuation application of U.S. application Ser. No. 14/569,546, filed Dec. 12, 2014, the complete disclosure of which is hereby incorporated by reference into this application.

BACKGROUND

The present disclosure relates to three-wheeled vehicles. A three-wheeled vehicle may have two rear wheels and a single front wheel, or two front wheels and a single rear wheel. The three-wheeled vehicles disclosed herein are characterized by two front wheels and a single rear wheel.

A three-wheeled vehicle may have straddle-type seating or conventional seating. For example, see U.S. Pat. Nos. 7,648, 148 and 7,464,781, which disclose a three-wheeled vehicle having straddle-type seating, and U.S. Pat. Nos. 8,695,746, and 7,588,110, which disclose three-wheeled vehicles having conventional seating; in each case, the complete disclosures of which are incorporated herein by reference. The present disclosure relates to three-wheeled vehicles including a cockpit with one or more recumbent seats.

A three-wheeled vehicle has a generally triangular footprint, which gives rise to unique physical dynamics that implicate the stability and handling of the vehicle. These physical dynamics can lead to suboptimum handling characteristics, which may even render a three-wheeled vehicle unsafe for the average driver. This is of concern to the industry, because three-wheeled vehicles are gaining increasing popularity. A segment of three-wheeled vehicles are emerging with various high performance features that enable the vehicle to offer an exhilarating experience that some may compare to driving a racecar.

There is therefore a need to provide three-wheeled vehicles having high performance features, and which also address vehicle stability and handling issues so as to provide an enjoyable and safe driving experience for skilled as well as average drivers. These needs are addressed by the present disclosure.

SUMMARY

A summary of certain embodiments disclosed herein is set forth below. It should be understood that these aspects are presented merely to provide the reader with a brief summary of these certain embodiments and that they are not intended to limit the scope of the present disclosure.

The present disclosure relates to three-wheeled vehicles. It should be understood that the various features of the exemplary three-wheeled vehicles disclosed herein may be implemented alone, together, or in combination with one another or other features known in the art. While the three-wheeled vehicles disclosed herein are characterized by two front wheels and a single rear wheel, it will be apparent that numerous aspects disclosed herein also apply to three-wheeled vehicles having a single front wheel, as well as to vehicles having four or more wheels.

In accordance with the present disclosure, three-wheeled vehicles are provided having an engine located rearward of the cockpit, for example, in a rear mid-engine configuration, and a drivetrain configured to power the front wheels. In some embodiments, a vehicle in accordance with the present disclosure comprises a frame, front wheels, each coupled to the frame, a single rear wheel coupled to the frame, a cockpit supported by the frame, an engine supported by the frame, and a drive assembly configured to transfer power from the engine to the front wheels.

The cockpit may be equipped with one or more recumbent seats, and one or more elevated floorboards dimensionally configured to receive a person's legs when the person is seated in one of the recumbent seats. The cockpit may have one or more recumbent seats and one or more elevated floorboards dimensionally configured to receive the legs of a person seated in the one or more recumbent seats. The cockpit may be configured to allow at least a portion of a person's body, when the person is seated in the cockpit, to be positioned at an elevation below the elevation of the axis defined by the centerline of the front wheels. The portion of the person's body positioned below such elevation may be at least a portion of one or more of: the coccyx, the sacrum, the pelvis, and the femur.

The recumbent seats may be positioned to allow at least a portion of the seats, e.g., the bottom surface of the seats, to be situated at an elevation below the elevation of the axis defined by the centerline of the front wheels. For example, the longitudinal center of gravity of the vehicle may intersect one of more of: the hips, the midline, or the torso, of a person seated in one of the recumbent seats. In some embodiments, the recumbent seats may be positioned at an elevation relative to the axis defined by the centerline of the front wheels and at a longitudinal distance rearward from the axis, such that when a person is seated in one of the recumbent seats, at least a portion of the person's body may be situated below the elevation of the axis while the axis intersects the person's legs situated above the floorboards.

The drive assembly may comprise a pair of front axle shafts that laterally traverse the cockpit beneath the elevated floorboards. The front axle shafts may laterally traverse beneath the elevated floorboards at about the longitudinal position where a person's legs would be situated when the person is seated in one of the recumbent seats.

A three-wheeled vehicle may be configured in accordance with the present disclosure so as to enhance the handling characteristics of the vehicle. In some embodiments, the three-wheeled vehicles disclosed herein provide for a well-balanced center of gravity and/or moment of inertia. In some embodiments, a three-wheeled vehicle is provided having a longitudinal center of gravity located at a distance rearward from the axis defined by the centerline of the front wheels that is between about 33% to 50% of the vehicle's wheelbase. The vehicle may be configured such that the longitudinal center of gravity of the vehicle intersects the cockpit. In some embodiments, a three-wheeled vehicle is provided having a cockpit with one or more recumbent seats, in which the longitudinal center of gravity of the vehicle intersects the vehicle's seating. The vehicle's engine may be positioned rearward of the longitudinal center of gravity of the vehicle. In some embodiments, a three-wheeled vehicle may have a rearward-biased moment of inertia. The location of such vehicle's longitudinal center of gravity and/or the vehicle's rearward-biased moment of inertia may be effected, at least in part, by configuring the vehicle in accordance with the present disclosure.

In some embodiments, a vehicle may be equipped with an engine cooling system having a radiator mounted to the vehicle's frame, for example, between a pair of rearward-sloping top rails. The vehicle may also be equipped with an air intake scoop configured to direct a stream of air to the radiator.

In some embodiments, an exhaust system may be provided comprising a resonator and a muffler with connecting exhaust pipes having an s-shaped configuration effective to allow the exhaust system to fit substantially adjacent to the vehicle's engine and within footprint of the vehicle's frame. The exhaust system may be supported by a bracket mounted directly to the engine block to allow the exhaust system to move with the engine, without resistance from the frame.

The foregoing summary may contain simplifications, generalizations, inclusions, and/or omissions of detail; consequently, those skilled in the art will appreciate that the summary is illustrative only and is not intended to be in any way limiting. In addition to the illustrative aspects, embodiments, and features described above, further aspects, embodiments, and features will become apparent by reference to the drawings, the following detailed description of certain embodiments, and the claims.

DETAILED DESCRIPTION OF EXEMPLARY EMBODIMENTS

In the following detailed description of exemplary embodiments, three-wheeled vehicles will be described in greater detail with reference to the accompanying figures. Numerous specific details are set forth in order to provide a thorough understanding of the disclosed vehicles. It will be apparent, however, to one skilled in the art that the presently disclosed vehicles may be provided without some or all of these specific details. In other instances, well known aspects have not been described in detail in order to not unnecessarily obscure the present disclosure. The following detailed description of exemplary embodiments is therefore not to be taken in a limiting sense, and it is intended that other embodiments are within the scope of the present disclosure.

I. Three-Wheeled Vehicles

General

Various features of three-wheeled vehicles in accordance with the present disclosure will now be discussed. Following that discussion, various handling characteristics of three-wheeled vehicles will be discussed.

Figure 1:
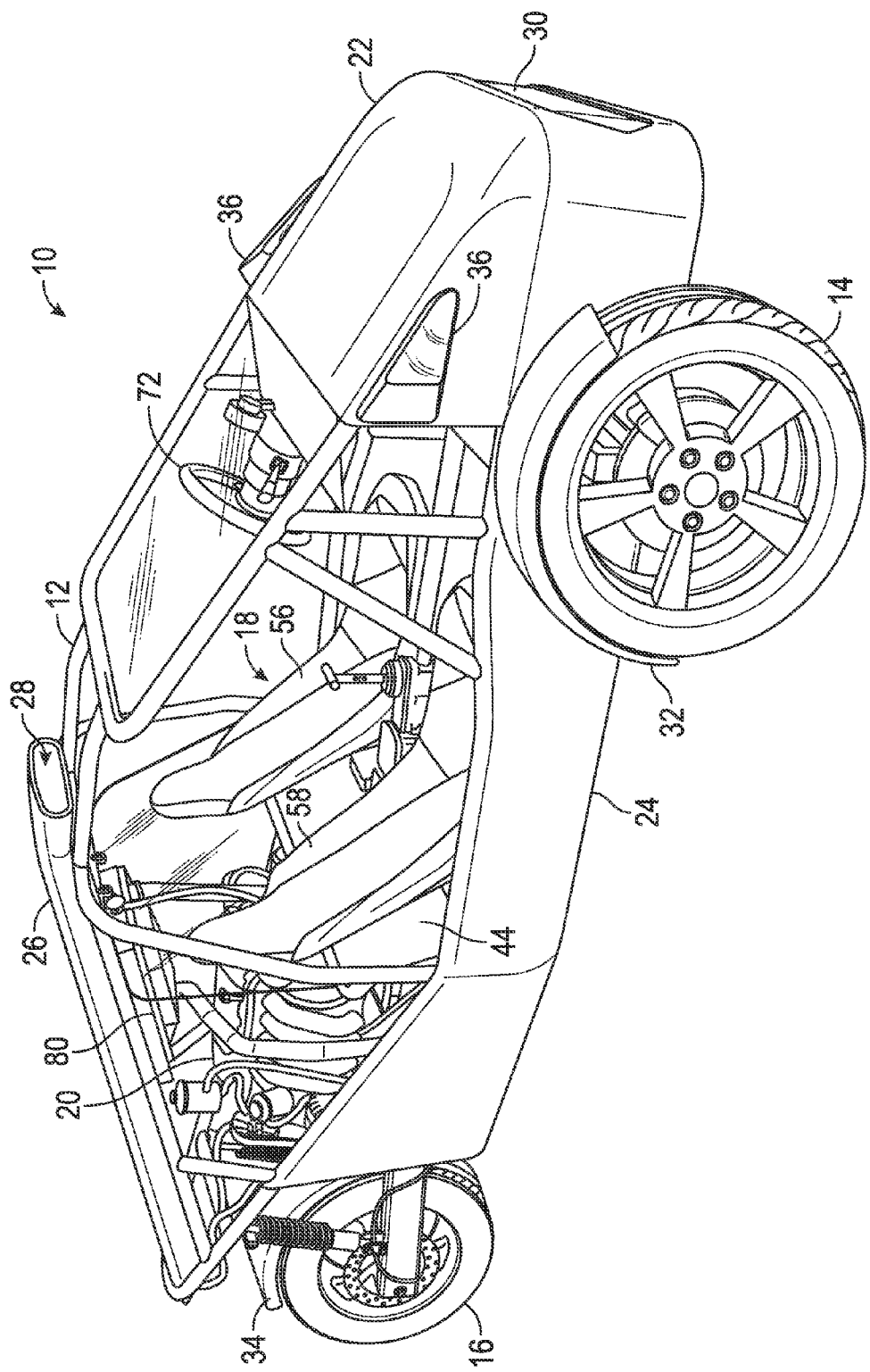
FIG. 1 is a front perspective view of an exemplary embodiment of a three-wheeled vehicle in accordance with the present disclosure.
Figure 2:
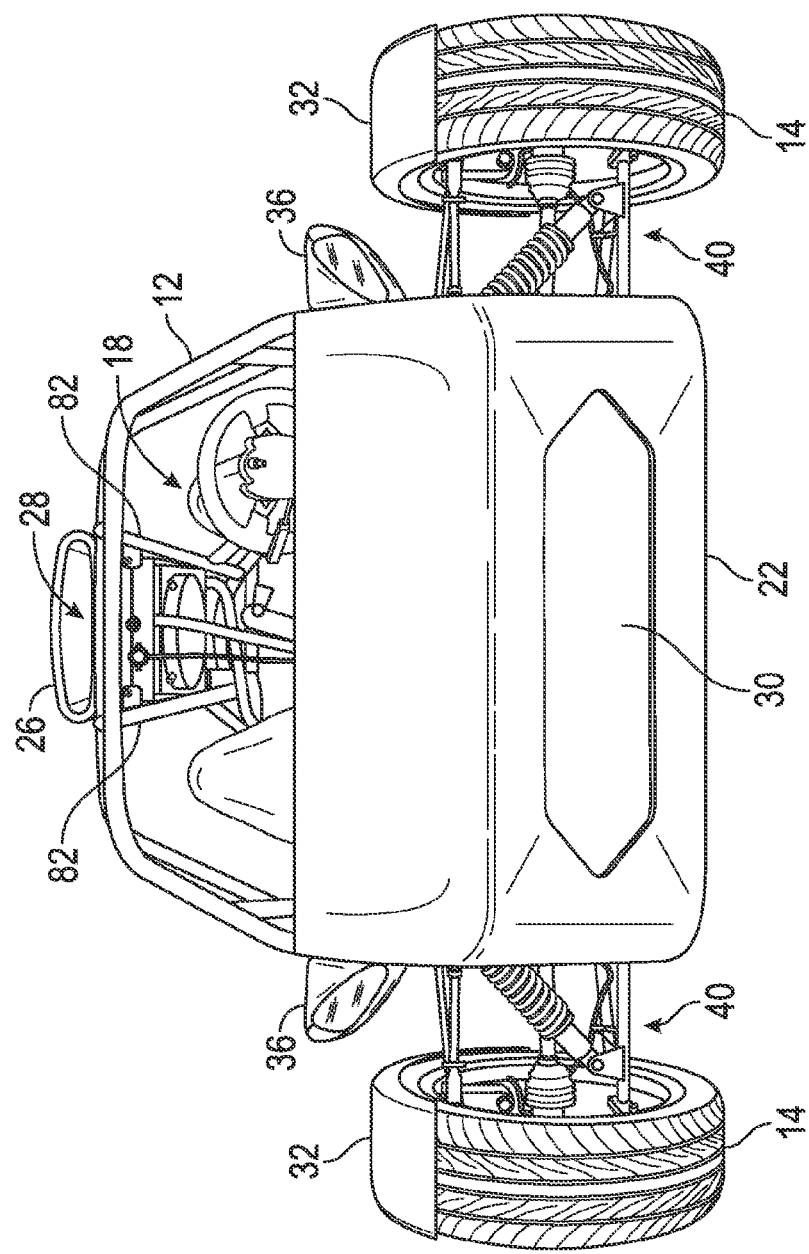
FIG. 2 is a front view of the exemplary three-wheeled vehicle of FIG. 1.
Figure 3:
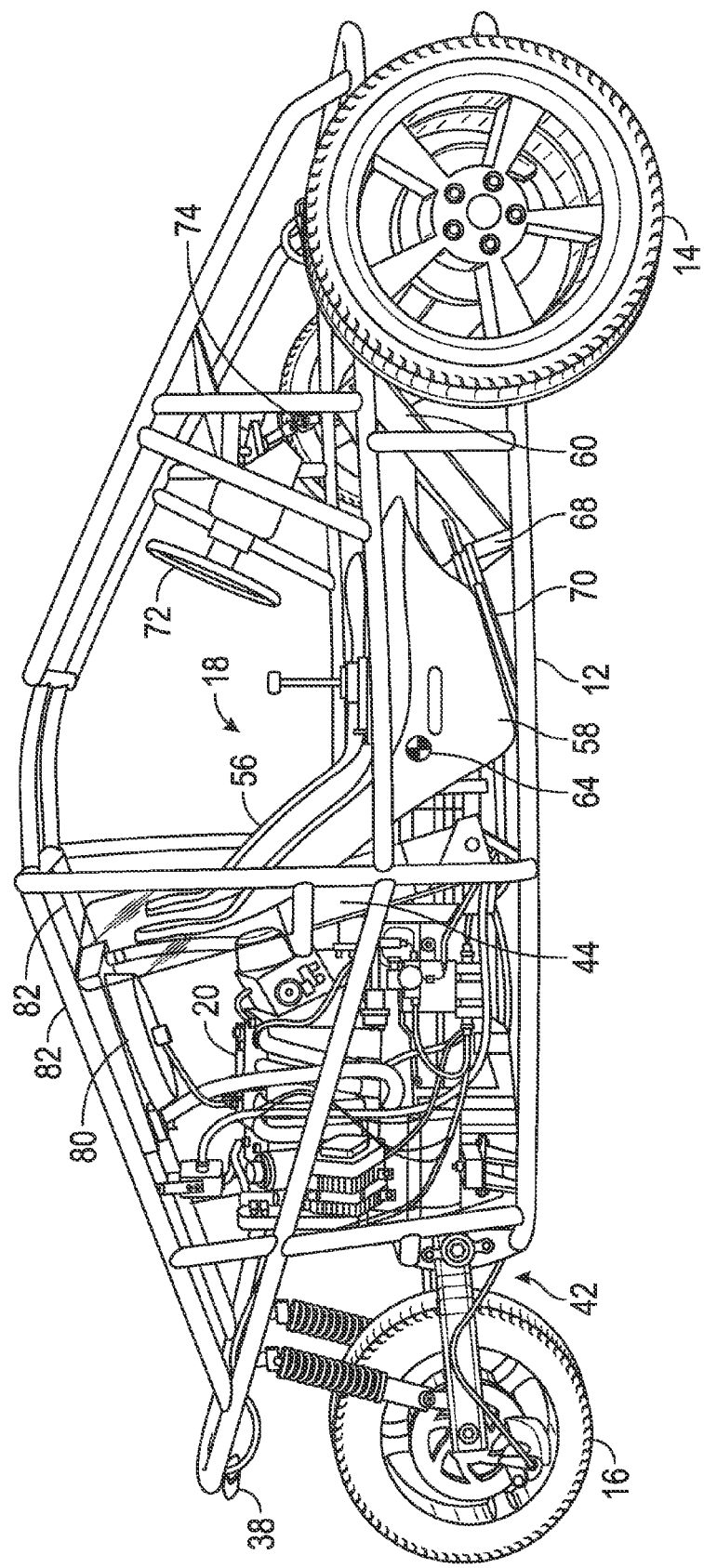
FIG. 3 is a side view of the exemplary three-wheeled vehicle of FIG. 1, with the bodywork of the vehicle removed.

With reference to FIGS. 1-9, an exemplary embodiment of a three-wheeled vehicle 10 is shown. Vehicle 10 is comprised of a frame 12 supported by front wheels 14 and a single rear wheel 16. A cockpit 18 is provided within the frame of the vehicle, and may be configured to accommodate one or more persons. The vehicles in accordance with the present disclosure include those having rear mid-engine, front-wheel drive powertrain configurations. Mid-engine refers to the placement of the engine between the rear and front axles of the vehicle. Rear mid-engine refers to the placement of the engine, more particularly, between the driver and the rear axle. The rear mid-engine configurations in accordance with the present disclosure may provide for enhanced handling characteristics as discussed in detail below. As shown in FIG. 3, an engine 20 is positioned rearward of the cockpit, in a rear mid-engine configuration. The engine is supported by the frame 12, for example, by elements of the frame located below the engine. The engine is coupled to a drive assembly configured to transfer power from the engine to the front wheels.

FIGS. 1 and 2 show a vehicle in accordance with the present disclosure having one or more body panels covering various aspects of the vehicle. The one or more body panels may be configured in any shape or style without departing from the spirit and scope of the present disclosure. In some embodiments, the one or more body panels may include a front panel 22, one or more side panels 24 on the left and right side of the vehicle, and one or more roof panels 26, which may include an air-scoop 28 configured to direct air into the engine's cooling system. The front panel 22 may be equipped with a latching hood (not shown) configured to provide access to mechanical aspects of the vehicle beneath the fairing. The front panel may also include a grill 30, which may be configured to allow air to pass through the front panel. The one or more side panels 24 may be configured to cover any portion of the vehicle's sides. As shown in FIG. 1, one or more side panels are provided, which cover only a lower aspect of the vehicle's sides, leaving the remainder uncovered to provide an open cockpit and engine compartment. In some embodiments, one or more side panels 24 may be equipped with doors (not shown) and/or latching panels (also not shown) configured to provide access to the engine compartment.

Figure 4:
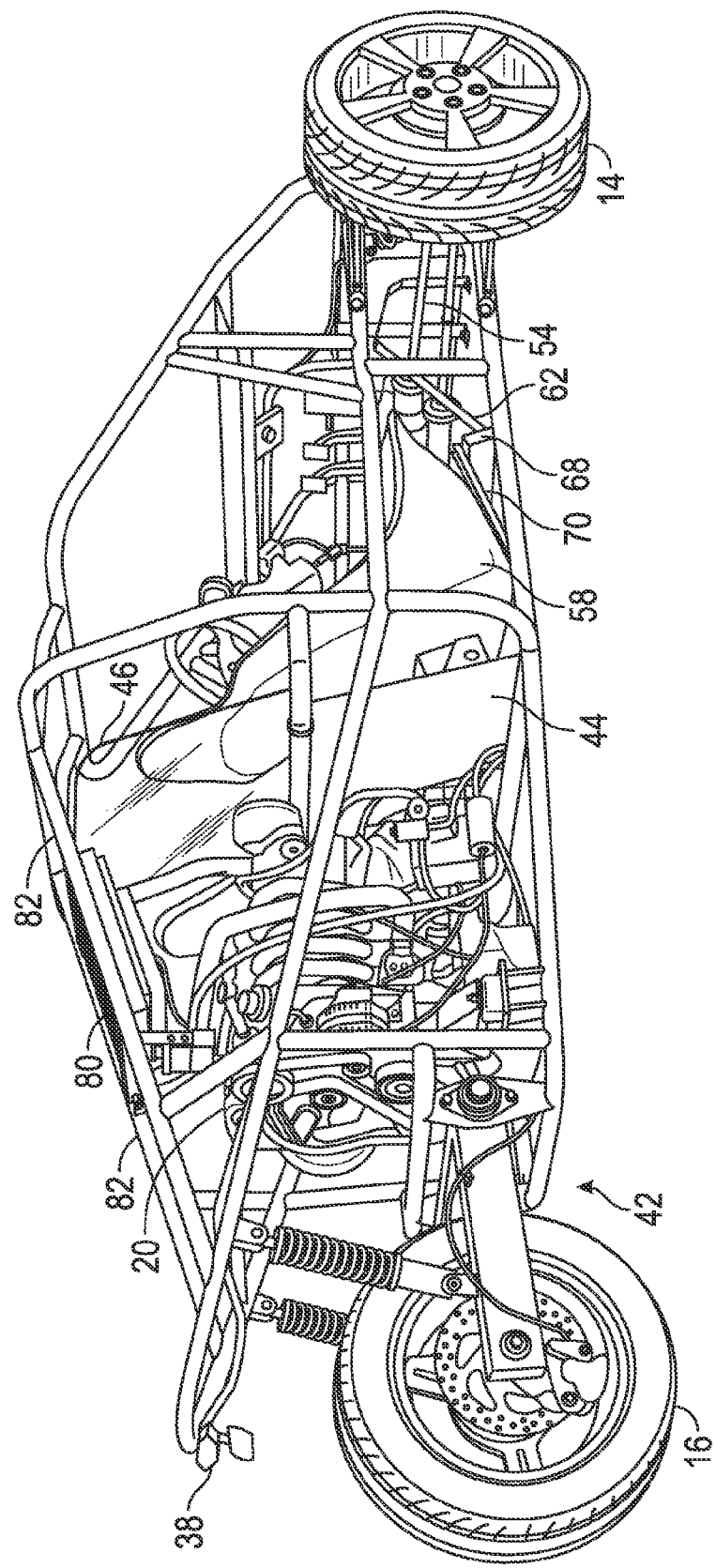
FIG. 4 is a rear perspective view of the exemplary three-wheeled vehicle of FIG. 1, with the bodywork and floorboards of the vehicle removed to show various components of the vehicle.

In some embodiments, the three-wheeled vehicles disclosed herein are designed for road use. As such, a three-wheeled vehicle in accordance with the present disclosure may be equipped with various features necessary to make the vehicle roadworthy in accordance with applicable regulations. The vehicle's front wheels 14 may be at least partially covered by a front fender 32, and the rear wheel may be at least partially covered by a rear fender 34. The vehicle may include headlights, taillights, and turn-signals. As shown in FIGS. 1 and 2, headlights are incorporated within a pair of headlight housings 36, each attached to an opposite side of the vehicle. These headlight housings may also include turn-signals and side-view mirrors (not shown). As shown in FIGS. 3 and 4, a taillight housing 38 is attached to the rear of the vehicle. The taillight housing may include a tail light and rear-turn signals.

In other embodiments, a three-wheeled vehicle in accordance with the present disclosure may be designed for off-road use, or for both on- and off-road use, in which case various off-road design features may be incorporated into a three-wheeled vehicle without departing from the spirit and scope of the present disclosure. These features may include suspension tuned for off-road use and/or having longer travel, tires with an off-road tread pattern, sway bars, frame design aspects configured to provide enhanced durability, and an engine and/or powertrain having performance characteristics commensurate with off-road operation.

With reference to FIGS. 3-8, an exemplary three-wheeled vehicle's frame, engine, drivetrain, and cockpit, as well as their respective configuration relative to one another in accordance with the present disclosure will be discussed. Configurations in accordance with the present disclosure allow may improve handling characteristics of a three-wheeled vehicle as disclosed herein.

FIG. 3 shows a side view of an exemplary three-wheeled vehicle. As shown in FIG. 3, the frame 12 comprises a tube frame made from a plurality of tubular elements. A tube-frame may be provided having virtually any configuration. Various tubular elements may be added, repositioned, or removed, for example, to change the appearance or structural properties of the frame, without departing from the spirit and scope of the present disclosure. Tubular elements also may be removed, for example, to provide an open-top frame. Other frame types may also be provided without departing from the spirit and scope of the present disclosure, such as a body-on-frame or a monocoque frame.

The frame 12 is supported by front wheels, each coupled to the frame by a front suspension assembly 40 (FIG. 2), and a single rear wheel, coupled to the frame by a rear suspension assembly 42. In accordance with the exemplary embodiment of FIGS. 1-9, the front-suspension assembly 40 may be a double-wishbone suspension configuration and the rear suspension assembly may be a single-pivot swing arm. Any other suspension configuration, including MacPherson strut or multi-link configurations, may also be utilized for the front or rear suspension without departing from the spirit and scope of the present disclosure.

The vehicle's engine 20 is positioned rearward of the cockpit 18, in a position referred to as a rear mid-engine. A vehicle's engine may be any apparatus used to convert energy into useful mechanical motion, including an internal combustion engine, an electric motor, and a hybrid-electric motor. The engine may be positioned at any desired location about the vehicle; for example, the location may be selected with a view towards the resulting center of gravity and/or moment of inertia of the vehicle in accordance with the present disclosure. In the exemplary embodiment of FIGS. 1-9, an internal combustion engine is provided. The engine may be an internal combustion engine having greater than 1.0 L of displacement. In some embodiments, the engine may have a displacement of between about 1.0 L to 8.0 L, about 1.0 L to 3.0 L, about 2.0 L to 4.0 L, or about 4.0 L to 8.0 L. For example, the engine may have a displacement of at least about 1.0 L, 1.5 L, 2.0 L, 2.5 L, 3.0 L, 3.5 L, 4.0 L, 4.5 L, 5.0 L, 5.5 L, 6.0 L, 6.5 L, 7.0 L, 7.5 L, 8.0 L, or any intermediate displacement volume. In some embodiments, the engine may have an output power of between about 100 HP to 800 HP, about 100 HP to 300 HP, about 200 HP to 400 HP, or about 400 HP to 800 HP. For example, the engine may have an output power of at least about 100 HP, 150 HP, 200 HP, 250 HP, 300 HP, 350 HP, 400 HP, 450 HP, 500 HP, 550 HP, 600 HP, 650 HP, 700 HP, 750 HP, 800 HP, or any intermediate output power. In some embodiments, the engine comprises an inline four-cylinder engine having between about 2.0 L to 2.4 L of displacement and an output power of at least about 160 HP. In some embodiments, the engine comprises an inline four-cylinder engine having 2.4 L of displacement and an output power of at least about 200 HP.

The engine may be mounted in the longitudinal or transverse configuration. The longitudinal configuration aligns the engine's crankshaft with the transmission and the longitudinal axis of the vehicle. With a transverse configuration, the engine's crankshaft is perpendicular to the transmission and the longitudinal axis of the vehicle. In accordance with the present disclosure, the engine is mounted in the longitudinal configuration. In some embodiments, an engine may have a plurality of cylinders aligned with the engine's longitudinal axis and/or other features which concentrate the engine's mass along the engine's longitudinal axis. Thus, in some embodiments, an engine mounted in the longitudinal configuration may position the engine's mass closer to the longitudinal center of gravity of the vehicle as compared to the engine being mounted in the transverse configuration.

In some embodiments, an engine that comprises an electric motor or a hybrid-electric motor may be provided. For example, an electric-drive vehicle may be provided, having an electric motor in addition to or as an alternative to an internal combustion engine. In some embodiments, a hybrid-electric vehicle may be provided. With an electric-drive or hybrid-electric vehicle, one or more batteries may be provided, to power the engine. Batteries may be positioned at any desired location about the vehicle; for example, the location may be selected with a view towards the resulting center of gravity and/or moment of inertia of the vehicle in accordance with the present disclosure.

As shown, for example in FIG. 4, the engine is separated from the cockpit by a firewall 44. The firewall is generally configured to extend across the substantial width of the cockpit, although as shown in FIG. 4, in some embodiments the horizontal edge of the firewall may be situated inward from the sidewall of the frame, such that an air-space is provided between them. The firewall may extend vertically any desired distance from the lower frame elements upward toward the upper frame elements or any intermediate location, for example, to a horizontal cross-member as shown in FIG. 4. In some embodiments, an upper firewall 46 is provided, which may extend vertically from the horizontal cross-member to the upper frame elements. The upper firewall may comprise a transparent or translucent material, to allow rearward visibility from the cockpit.

Figure 5:
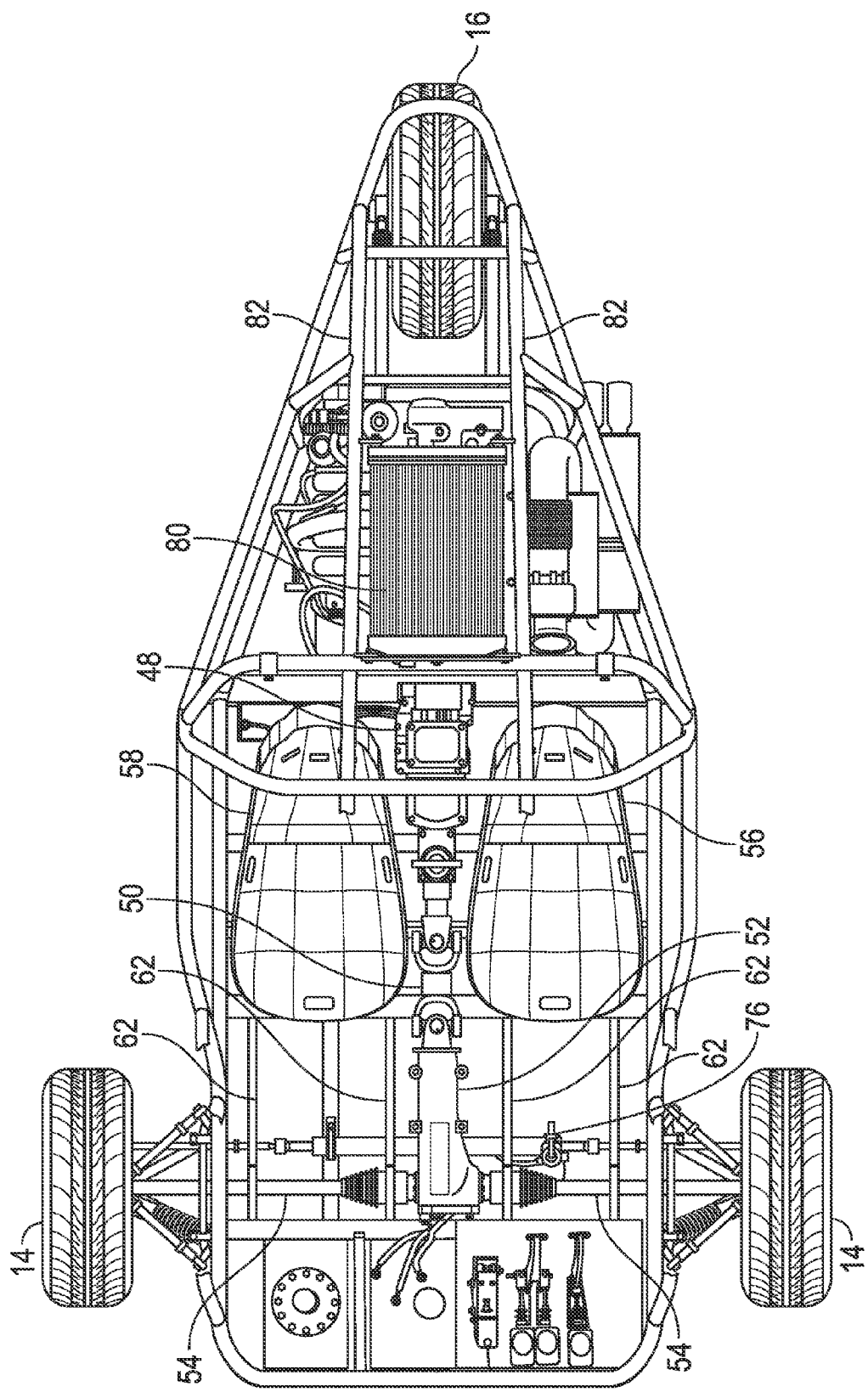
FIG. 5 is a top view of the exemplary three-wheeled vehicle of FIG. 1, with the bodywork and floorboards removed, and various frontward frame elements and dashboard cutaway, to show various components of the drivetrain.
Figure 6:
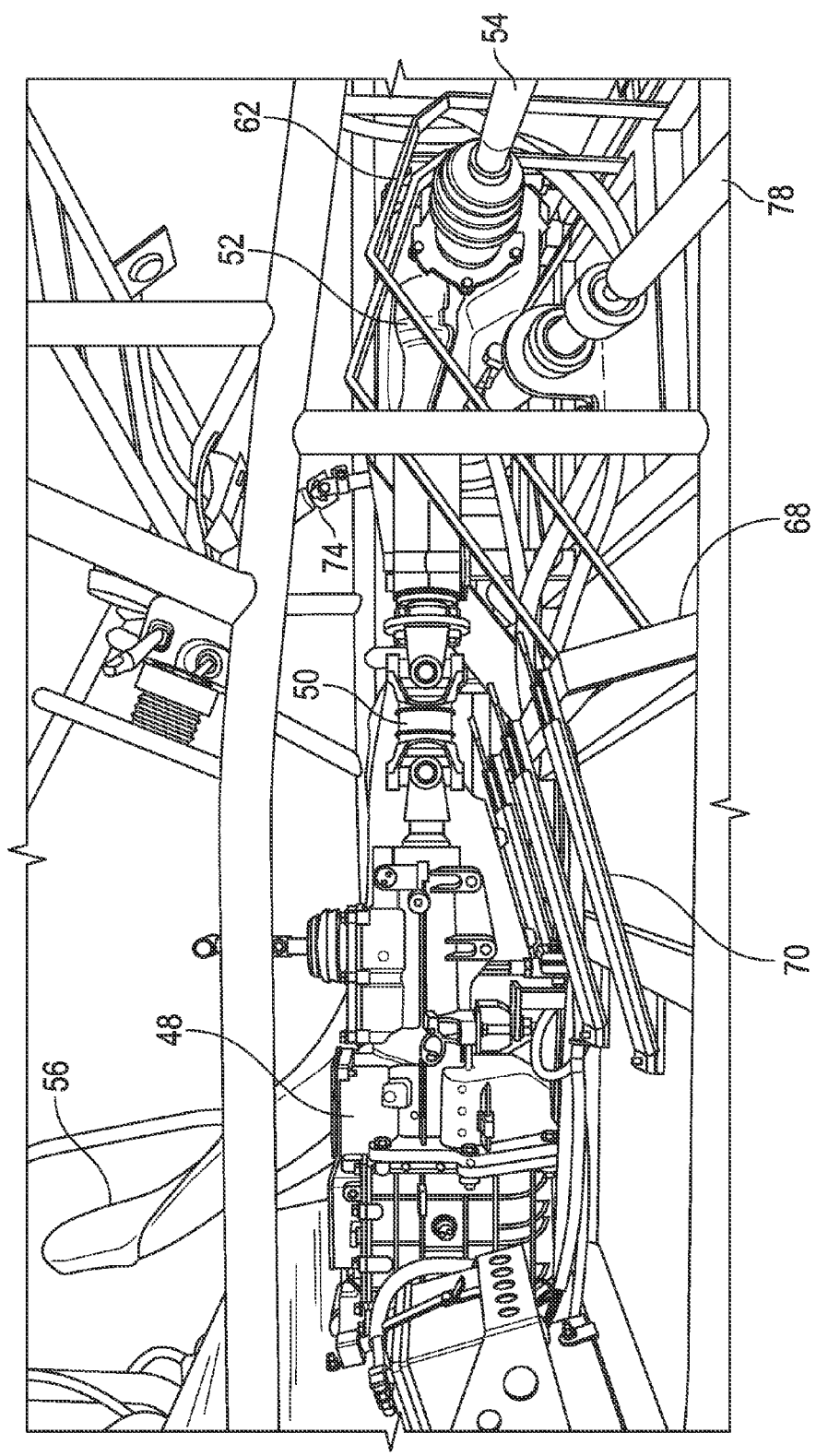
FIG. 6 is a partial side-view of the drivetrain of the exemplary three-wheeled vehicle of FIG. 1. The passenger seat and floorboard are removed to show various components of the drivetrain.
Figure 7:
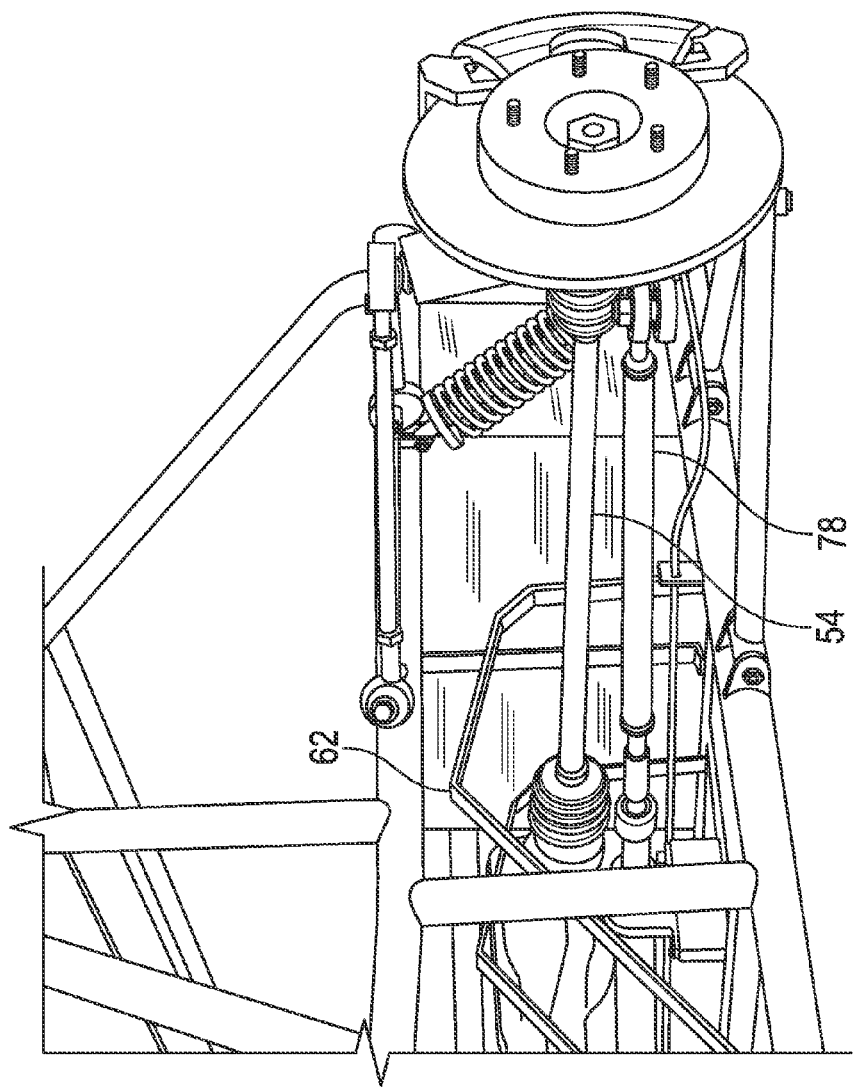
FIG. 7 is a rear perspective view of the front right axle shaft and steering assembly of the exemplary three-wheeled vehicle of FIG. 1.

The engine is coupled to a drive assembly configured to transfer power from the engine to the front wheels. As shown in FIGS. 5 and 6, the drive assembly comprises a transmission 48 drivingly coupled to the engine, a drive shaft 50 having a first end drivingly coupled to the transmission, and a second end drivingly coupled to a differential 52, and a pair of front axle shafts 54, each shaft having first ends end drivingly coupled to opposite ends of the differential and second ends drivingly coupled to the front wheels 14. The transmission may be a manual transmission, an automatic transmission, a semi-automatic transmission, a continuously variable transmission, or any other desired transmission. Manual shifting inputs may be provided via a hand shifter, paddle shifters, or any other desired shifting means.

As shown in FIGS. 5 and 6, the transmission, drive shaft, and differential are routed centrally through the cockpit. The drive assembly is routed above the bottom surface of the frame 12, i.e., the frame comprises a plurality of frame elements defining a bottom surface, and the elevation of the bottom surface is below the elevation of the axis defined by the centerline of the front wheels.

Figure 8:
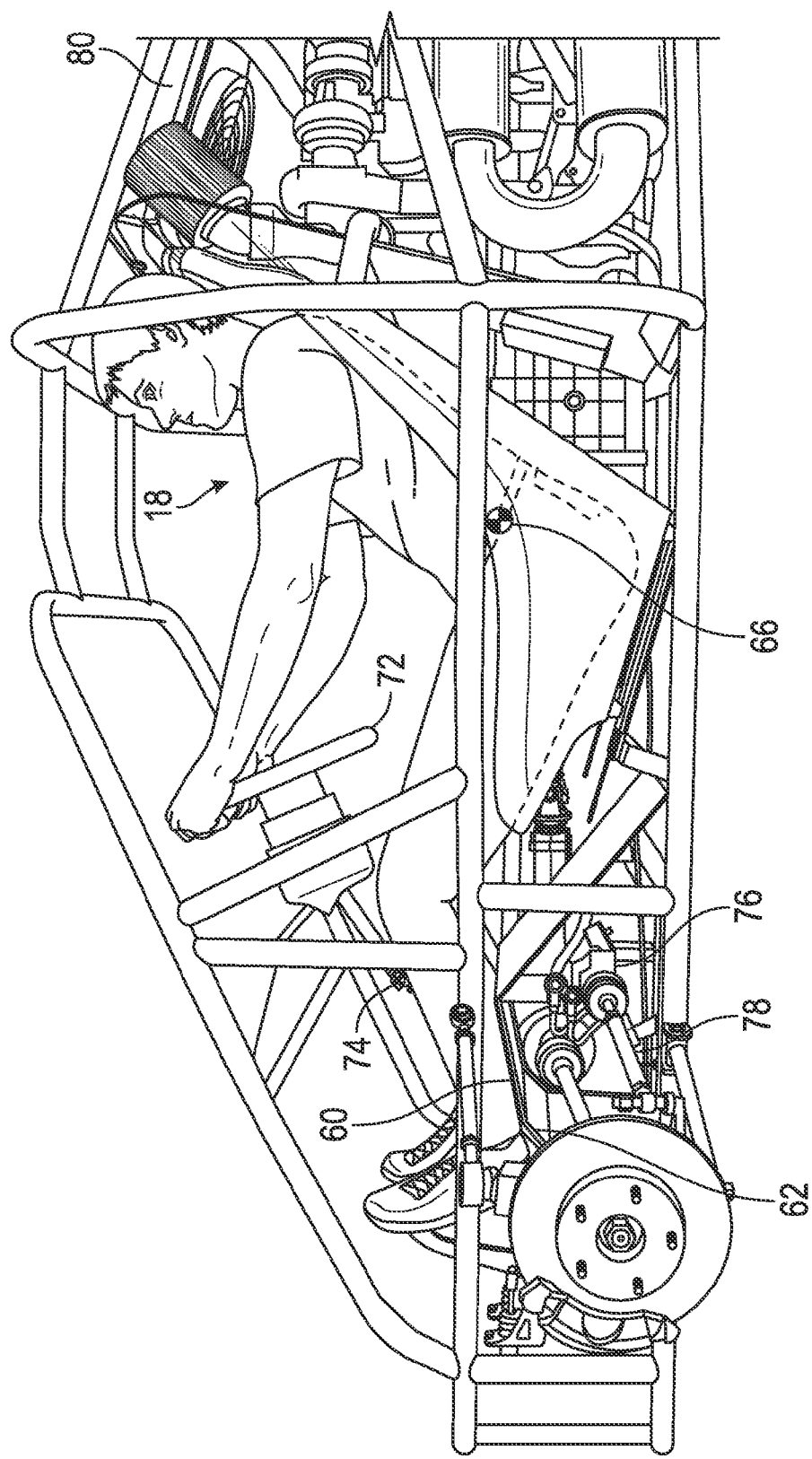
FIG. 8 is a partial side view of the frontward left side of the exemplary three-wheeled vehicle of FIG. 1, with the bodywork and front wheel of the vehicle removed to show various aspects of the vehicle. A driver is shown seated in the driver's seat of the vehicle.

The cockpit comprises a driver's seat 56 and, optionally, a passenger's seat 58 in a side-by-side configuration relative to the driver's seat. As shown in FIGS. 3 and 8, the seats are situated in a recumbent position. The recumbent seats allows for a person's legs to be in a somewhat elevated position, such that the front axle shafts may laterally traverse the cockpit beneath one or more elevated floorboards 60 at about the longitudinal position where a person's legs would be situated when the person is seated in the cockpit. In FIGS. 4-7, the elevated floorboards 60 are removed to show the front axle shafts 54 routed beneath. When installed, the elevated floorboards are supported by floorboard supports 62, which can be seen in FIGS. 4-8. As shown in FIG. 8, the elevated floorboards are configured to receive a person's legs when the person is seated in one of the recumbent seats, thereby separating the person's legs from the front axle shafts and other components routed beneath the floorboard. When seated in the cockpit, a person's lower legs may align substantially parallel with at least one aspect of the floorboards, thereby allowing the floorboards to ergonomically receive the person's legs extending outward from the recumbent seat. In some embodiments, the recumbent seats may be positioned at an elevation relative to the axis defined by the centerline of the front wheels and at a longitudinal distance rearward from the axis, such that when a person is seated in one of the recumbent seats, at least a portion of the person's body may be situated below the elevation of the axis while the axis intersects the person's legs situated above the floorboards. By positioning at least a portion of the driver's body at an elevation below the elevation defined by the axis of the front axle shafts, the person's contribution to the vehicle's center of gravity height is reduced relative to a more elevated seating position, which may improve handling characteristics of the vehicle as disclosed herein.

In some embodiments, a three-wheeled vehicle in accordance with the present disclosure may be configured such that the longitudinal center of gravity of the vehicle intersects the location of seating provided for one or more occupants of the vehicle. For example, in some embodiments a three-wheeled vehicle is provided having a longitudinal center of gravity that intersects the vehicle's seating at about the rearward aspect of the seat bottom, e.g., within about 6 inches, 5 inches, 4 inches, 3 inches, 2 inches, or 1 inches in either direction of the intersection between the seat bottom and seat back. The longitudinal center of gravity of an exemplary three-wheeled vehicle is shown in FIGS. 3 and 8. Specifically, FIG. 3 shows longitudinal and vertical coordinates 64 of the center of gravity for the vehicle without passengers, and FIG. 8. shows longitudinal and vertical coordinates 66 of the center of gravity for the vehicle, when a driver that weighs about 180 pounds is seated in the vehicle. The vehicle's longitudinal center of gravity intersects the cockpit, and the vehicle's engine is positioned rearward of the longitudinal center of gravity, e.g., in a rear mid-engine configuration. In accordance with the exemplary embodiment of FIGS. 3 and 8, the vehicle's longitudinal center of gravity may intersect the seats (56, 58) at about the juncture between the bottom surface of the seat and the seat back, e.g., within about 2 inches of the intersection between the seat bottom and seat back.

The seating configuration in accordance with the present disclosure allows for the occupants to be located at about the longitudinal center of gravity of the vehicle, thereby placing the center of gravity of the occupants at about the location of the longitudinal center of gravity of the vehicle. This lessens any change in the vehicle's longitudinal center of gravity resulting from the one or more occupants having been seated in the vehicle and concentrates the occupant's moment of inertia around the vehicle's center of gravity, thereby lessening any effect on the vehicle's handling characteristics which may be attributable to the weight of the occupants. Such a configuration may also be effective to minimize any change in the vehicle's handling characteristics when the vehicle is operated by drivers of varying weights and sizes and/or when a passenger is present or absent from the vehicle. The seating configuration in accordance with the present disclosure may also be effective to reduce the acceleration forces experienced by the occupants of the vehicle.

In some embodiments, a three-wheeled vehicle may be provided in which the addition of one or more passengers shifts vehicle's longitudinal center of gravity by less than about 3.0 inches, less than about 2.0 inches, less than about 1.0 inch, or less than about 0.5 inches, in either direction. In some embodiments, the addition of one or more passengers shifts the vehicle's longitudinal center of gravity towards the axis defined by the centerline of the front wheels. In some embodiments, a three-wheeled vehicle may be provided in which the addition of one or more passengers increases the vehicle's center of gravity height by less than about 3.0 inches, less than about 2.0 inches, less than about 1.0 inch, or less than about 0.5 inches, in either direction.

As shown in FIG. 3, without passengers, the exemplary vehicle of FIG. 1-9 has a longitudinal center of gravity located at a distance of about 36 inches rearward from the axis defined by the centerline of the front wheels, and a center of gravity height that is about 16.4 inches above the driving surface. As shown in FIG. 8, with the addition of a driver that weighs about 180 pounds, the exemplary vehicle has a longitudinal center of gravity located at a distance of about 35.6 inches rearward of the axis defined by the centerline of the front wheels, and a center of gravity height that is about 17.6 inches above the driving surface. Thus, with the addition of such a driver to the exemplary vehicle of FIGS. 1-9, the location of the vehicle's longitudinal center of gravity shifts about 0.4 inches towards the axis defined by the centerline of the front wheels and about 1.2 inches upward, for an aggregate change of about 1.27 inches. By minimizing the change in the location of the vehicle's center of gravity, any change in the vehicle's handling characteristics that otherwise may be attributable to the addition of one or more passengers may be correspondingly minimized. Likewise, such a vehicle can be expected to exhibit substantially consistent handling characteristics across a range of drivers of varying weights or heights and/or with the addition or subtraction of a passenger, on account of the vehicle's configuration providing for a relatively stable center of gravity location across such changes.

In some embodiments, the cockpit configuration in accordance with the present disclosure allows for the vehicle's longitudinal center of gravity to intersect the seating location of one or more occupants of the vehicle. The cockpit configuring may provide for such intersect while additionally, the axis defined by the centerline of the front wheels intersects the legs of such one or more occupants when seated in the cockpit. In some embodiments, such configuration may also allow at least a portion of a person's body, when seated in the cockpit, to be situated below the elevation of the center of gravity height of the vehicle and/or below the elevation of the axis defined by the centerline of the front wheels. With such cockpit configurations, space may be provided for the legs of the one or more occupants above the elevated floorboards, with the front axle shafts routed below the floorboards, thereby allowing the occupants to be seated within the cockpit at a distance rearward from the front axle shafts that would otherwise lack sufficient space for the occupant's legs if not for the space provided above the floorboards. Such configurations of the cockpit, seating, and front axle shafts relative to one another may provide enhanced handling characteristics as disclosed herein.

In some embodiments, the cockpit may be equipped with recumbent seats for one or more persons. The cockpit may be configured such that the vehicle's longitudinal center of gravity intersects a person's body, when seated in one of the recumbent seats, at about the longitudinal position of the person's hips, midline, or torso. The vertical coordinate of a vehicle's center of gravity (i.e., center of gravity height) may also intersect the person's hips, midline, or torso when seated in one of the recumbent seats. For example, in some embodiments, at least a portion of the person's coccyx, sacrum, pelvis, and/or femur may be positioned at an elevation below the location of the center of gravity height of the vehicle.

As shown in FIG. 8, the longitudinal center of gravity of the exemplary three-wheeled vehicle intersects the driver at about the driver's waist, and about midway between the front and rear aspects of the driver's torso. Likewise, as shown in FIG. 8, the location of the vehicle's center of gravity height intersects the driver at about the driver's waist, such that at least a portion of the driver's coccyx, sacrum, pelvis, and/or femur is positioned at an elevation below the location of the center of gravity height of the vehicle. As such, the center of gravity of the driver may be closely aligned with the longitudinal center of gravity of the vehicle, which may improve handling characteristics as disclosed herein.

In some embodiments, the recumbent position of a seat may be achieved by mounting brackets 68, configured to raise the frontward edge of the seat above the rearward edge of the seat. The mounting brackets may be seen more clearly in FIG. 6, which shows the passenger's seat removed to reveal the mounting brackets. The seats may be secured to the mounting brackets via slide tracks 70 configured to allow adjustment of the lateral position of the seat, for example, to accommodate a range of people of various heights. The seats may be secured to the slide tracks, and the mounting brackets may be secured to the bottom surface of the frame, by one or more bolts, welds, or other suitable means.

In some embodiments, the floorboards 60 may also be configured to accommodate various other components, such as steering system components. As shown for example in FIG. 8, the vehicle may be equipped with a steering system comprising a steering wheel 72 operably coupled to a steering column 74, which is operably coupled to a linear actuator (e.g., rack and pinion) 76 configured to actuate tie rods 78 operably coupled to the front wheels 14. The linear actuator and tie rods may be situated beneath the floorboards, with the tie rods laterally traversing the cockpit beneath the floorboards at about the longitudinal position where a person's legs would be situated when the person is seated in one of the recumbent seats.

In some embodiments, a may be equipped with a cooling system comprising a radiator. As shown in FIGS. 1-5 and 9, a radiator 80 is operably coupled to the engine 20. The vehicle's frame may comprise a roll cage, and the radiator may be mounted to the roll cage, for example, between a pair of rearward-sloping top rails 82.

In some embodiments, an air scoop 28 may be configured to direct a stream of air to the radiator. The radiator surface configured to receive the stream of air may be positioned in substantial planar alignment with the top rails 82. In some embodiments, the cooling system configuration in accordance with the present disclosure may help facilitate a rear mid-engine powertrain configuration, a balanced center of gravity, and/or a rearward-biased moment of inertia.

Figure 9:
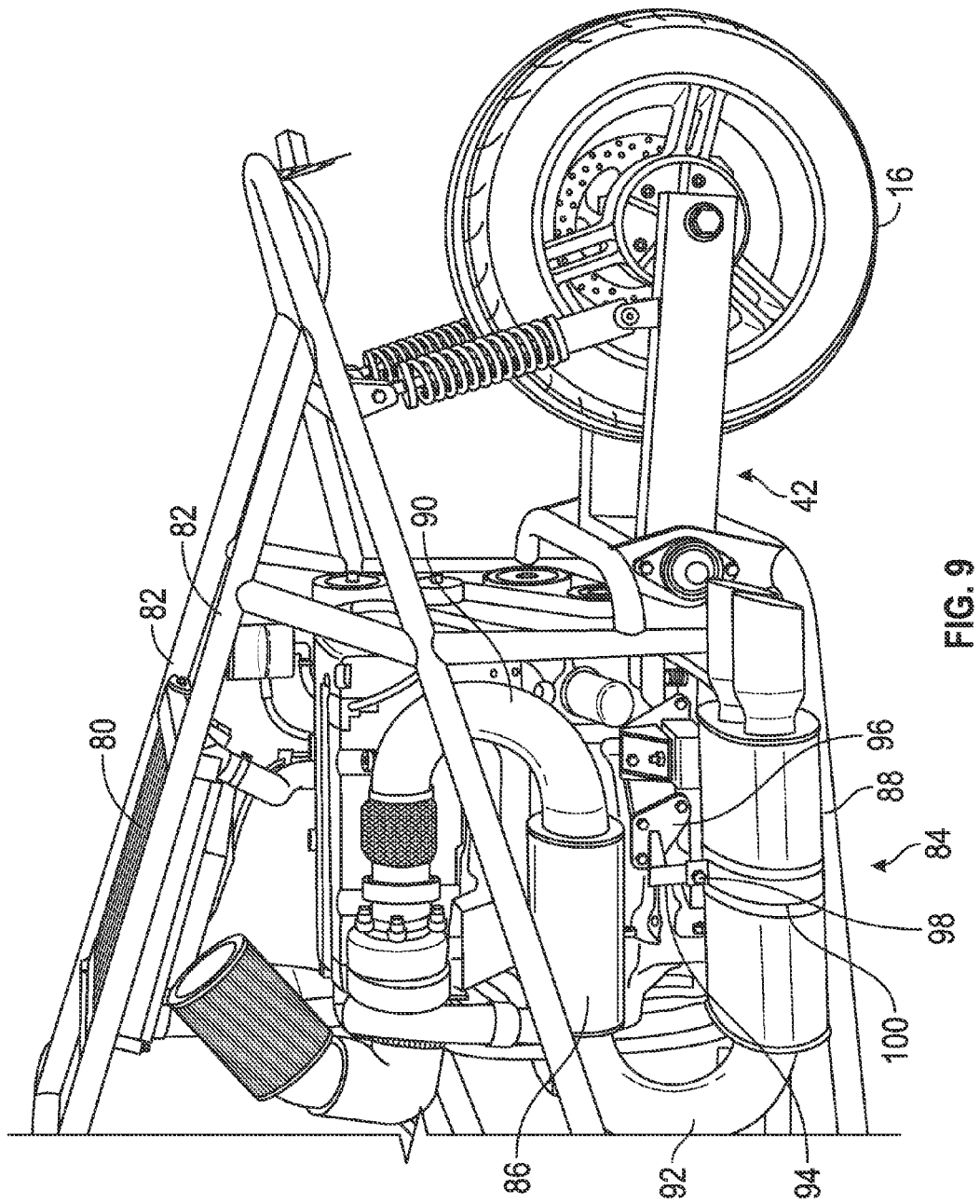
FIG. 9 is a partial side view of the rearward left side of the exemplary three-wheeled vehicle, with the bodywork removed to show various aspects of the vehicle's exhaust system.

As shown in FIG. 9, in some embodiments a vehicle may be equipped with an exhaust system 84 having an s-shaped configuration that allows the exhaust system to fit substantially adjacent to the vehicle's engine. The exhaust system may be located substantially within the footprint of the vehicle's frame and substantially forward of the rear suspension assembly 42, and may comprise a resonator 86 and a muffler 88. The resonator may be configured to receive exhaust through a first exhaust pipe 90, at least a portion of the exhaust pipe having a bend of about 180 degrees, and the muffler may be configured to receive exhaust from the resonator through a second exhaust pipe 92, at least a portion of the second exhaust pipe having a bend of about 180 degrees. Exhaust exiting the muffler may be directed through one or more tail pipes 84. The exhaust system 84 may be stabilized by a bracket 94 having a first end 96 secured directly to the engine 20 and a second end 98 secured to the exhaust system, for example via a straddle bracket 100 wrapped around the muffler 88. The bracket 94 may be effective to allow the exhaust system 84 to move with the engine 20 without resistance from the vehicle's frame 12. For example, as the engine vibrates during operation, the exhaust system may concurrently vibrate without resistance from the vehicle's frame. In some embodiments, the bracket 94 may be effective to prolong the longevity of the exhaust system 84.

Various features of three-wheeled vehicles in accordance with the present disclosure have been discussed. Next, various handling characteristics of three-wheeled vehicles will be discussed.

II. Three-Wheeled Vehicle Handling Characteristics

Vehicle handling describes the way a vehicle performs transverse to its direction of motion, particularly during cornering and swerving. Two important characteristics of vehicle handling are rollover stability and lateral stability. Various embodiments of a three-wheeled vehicle may be provided in accordance with the present disclosure having enhanced handling characteristics. As detailed below, the handling characteristics of a three-wheeled vehicle may be enhanced by, among other things, adjusting the location of the vehicle's longitudinal center of gravity, the vehicle's center of gravity height, tipping threshold, track width, understeer gradient, static margin, moment of inertia, neutral steer point, and/or combinations of those.

Rollover Stability

Rollover stability reflects a vehicle's resistance to tipping over in a turn. The rollover stability of a three-wheeled vehicle increases as the vehicle's longitudinal center of gravity is shifted forward towards the two-wheeled front axle. Thus, front-engine configurations may be viewed as an attractive design configuration; however, as discussed in more detail below, a center of gravity that is too far forward will inhibit other important handling characteristics associated with the vehicle's oversteer gradient and moment of inertia. The handling characteristics of a three-wheeled vehicle may be enhanced while maintaining sufficient rollover stability by providing a longitudinal center of gravity located at a distance rearward from the axis defined by the centerline of the front wheels that is greater than at least about 33% of the vehicle's wheelbase. The vehicle will generally exhibit sufficient rollover stability so long as the longitudinal center of gravity is located at a distance rearward from the axis defined by the centerline of the front wheels that is less than about 50% of the vehicle's wheelbase. However, a more narrow range may be required depending on the particular desired configuration of the vehicle in accordance with the present disclosure.

A vehicle's longitudinal center of gravity $CG_l$, measured rearward from the axis defined by the centerline of the front wheels, may be determined from the proportion of a vehicles' total weight born by the front axle, as follows:

$$CG_l = L - L(W_f/W) \qquad (1)$$

where L is the wheelbase of the vehicle, $W_f$ is the weight supported by the front axle, and W is the total weight of the vehicle.

In accordance with the present disclosure, a three-wheeled vehicle is provided having a longitudinal center of gravity located at a distance rearward from the axis defined by the centerline of the front wheels that is between about 33% to 50% of the vehicle's wheelbase, or between about 35% to 40% of the vehicle's wheelbase. In some embodiments, the longitudinal center of gravity may be located at a distance rearward from the axis defined by the centerline of the front wheels that is greater than about 33%, 34%, 35%, 36%, 37%, 38%, 39%, or 40%, and upwards to about 50% of the vehicle's wheelbase. In accordance with the exemplary embodiment of FIGS. 1-9, a three-wheeled vehicle is provided having a longitudinal center of gravity located at a distance rearward from the axis defined by the centerline of the front wheels that is between about 37.5% to 38.5% of the vehicle's wheelbase.

In some embodiments, the wheelbase of a three-wheeled vehicle in accordance with the present disclosure may be between about 48 to 144 inches, between about 48 to 84 inches, between about 84 to 120 inches, between about 90 to 102 inches, or between about 94 to 98 inches. For example, the wheelbase of a three-wheeled vehicle in accordance with the present disclosure may be between about 48 to 54 inches, between about 54 to 60 inches, between about 60 to 66 inches, between about 66 to 72 inches, between about 72 to 78 inches, between about 84 to 90 inches, between about 90 to 96 inches, between about 96 to 102 inches, between about 102 to 108 inches, between about 108 to 114 inches, between about 114 to 120 inches, between about 120 to 126 inches, between about 126 to 132 inches, between about 132 to 138 inches, between about 138 to 144 inches, or any intermediate length. The exemplary embodiment of FIGS. 1-9 has a wheelbase of about 96 inches; however, three-wheeled vehicles having virtually any wheelbases may be provided in accordance with the present disclosure without departing from the spirit and scope hereof. For example, the wheelbase may be adjusted to provide for different sized vehicles, to provide vehicles having different purposes or performance characteristics, to accommodate engines of different sizes, and/or to provide for a larger or smaller cockpit, including one or more additional rows of seating, for example a second row of seats, or more.

In some embodiments, a three-wheeled vehicle may be provided in accordance with the present disclosure that has a longitudinal center of gravity located at a distance rearward from the axis defined by the centerline of the front wheels, of between about 18 to 72 inches, between about 18 to 22 inches, between about 22 to 26 inches, between about 26 to 30 inches, between about 30 to 34 inches, between about 34 to 38 inches, between about 38 to 42 inches, between about 42 to 44 inches, between about 44 to 48 inches, between about 48 to 52 inches or between about 52 to 54 inches, between about 54 to 60 inches, between about 60 to 64 inches, between about 64 to 68 inches, between about 68 to 72 inches, or any intermediate distance. The exemplary embodiment of FIGS. 1-9, has a longitudinal center of gravity located about 36 inches rearward from the axis defined by the centerline of the front wheels; however, three-wheeled vehicles having a longitudinal center of gravity located at virtually any position may be provided as taught in accordance with the present disclosure, without departing from the spirit and scope hereof.

Rollover stability of a three-wheeled vehicle may be increased by shifting the vehicle's longitudinal center of gravity towards the axis defined by the centerline of the front wheels. However, a longitudinal center of gravity that is too far forward may result in an inadequate vertical load on the rear axle and consequently inadequate traction, as well as inadequate lateral stability of the vehicle, as discussed in more detail below. In some embodiments, the rear mid-engine location provided for in the three-wheeled vehicles of the present disclosure is effective to provide a longitudinal center of gravity at a location that enhances handling characteristics while maintaining adequate stability.

The rollover stability of a three-wheeled vehicle may be enhanced by lowering the vehicle's center of gravity height. A reduction in center of gravity height increases the lateral force necessary to cause rollover by reducing leverage. A vehicle's center of gravity height may be determined from the difference in weight of one of the vehicle's axles when the wheel(s) of the opposite axle are positioned on a block so as to elevate that axle a short distance, e.g., between about 10 to 20 inches. Either the front axle or the rear axle may be elevated, and then the weight obtained for the opposite axle according to known methods.

Center of gravity height $CG_h$, measured vertically from the driving surface, may thus be calculated as:

$$CG_h = \frac{L(W_r - W_l)}{W_t \left[ \frac{h}{\sqrt{L^2 - h^2}} \right]} + R_t \qquad (2)$$

where $W_r$ is the weight of the rear axle when the front axle is elevated, $W_l$ is the weight of the rear axle when the front axle is in its normal position, $W_t$ is the total weight of the vehicle, h is the amount by which the front axle is elevated, $R_t$ is the average rolling radius of the wheels, weighted by the proportion of weight born by the respective axle and reduced by a load factor, as follows:

$$R_f\left(\frac{W_f}{W_t}\right) + R_r\left(\frac{W_l}{W_t}\right),$$

where $R_f$ is the rolling radius of the front wheels and $R_r$ is the rolling radius of the rear wheel. Typically, the rolling radius is the actual radius reduced by a load factor.

In some embodiments, a three-wheeled vehicle is provided having a center of gravity height of less than about 18.0 inches, for example, between about 10 to 18 inches, or about 15 to 18 inches. In some embodiments, the center of gravity height may be less than about 18.0 inches, 17.5 inches, 17.0 inches, 16.5 inches, 16.0 inches, 15.5 inches, 15.0 inches, 14.5 inches, 14.0 inches, 13.5 inches, 12.0 inches, 11.5 inches, 11.0 inches, 10.5 inches, 10.0 inches, any intermediate height, or lower. In some embodiments, the center of gravity height of the vehicle may be between about 15 inches to about 18 inches.

In accordance with the exemplary embodiment of FIGS. 1-9, a three-wheeled vehicle is provided having a center of gravity height of about 16.4 inches without occupants, and about 17.6 inches with a driver that weighs about 180 pounds. In some embodiments, the center of gravity height may be reduced further, for example, by reducing the mass of frame elements that make up the roll cage, by providing a more minimalist embodiment of a roll case, or by omitting aspects of the roll cage altogether. The center of gravity height may also be reduced by positioning the radiator at a lower elevation.

Rollover stability of a three-wheeled vehicle may be characterized by a static stability factor $F_c$, which depends on the relationship between the vehicle's center of gravity height and longitudinal center of gravity. The static stability factor represents the tipping threshold $F_c$, stated as a multiple of the acceleration of gravity force above which a lateral acceleration $a_y$ would cause the inside front tire of the three-wheeled vehicle to have zero vertical load. Accordingly, the tipping threshold of a three-wheeled vehicle under static conditions may be characterized by the inequality:

$$a_y \geq \frac{t(L - CG_l)}{2L \times CG_h} = F_c \qquad (3)$$

where t is the track width of the vehicle, L is the wheelbase of the vehicle, $CG_l$ is the longitudinal center of gravity measured rearward from the axis defined by the centerline of the front wheels, and $CG_h$ is the center of gravity height measured vertically from the driving surface. The actual tipping threshold may be greater than the force characterized in equation (3) due to dynamics such as varying coefficient of friction between the vehicle's tires and the driving surface, tire deflection, suspension movement, impulses from uneven terrain, or other factors. Nevertheless, the relative stability of various three-wheeled vehicle configurations may be compared to one another using the static stability factor or tipping threshold from equation (3).

In some embodiments, the tipping threshold of a three-wheeled vehicle in accordance with the present disclosure may be between at least about 0.5 g to at least about 3.0 g, for example, at least about 0.5 g, 0.6 g, 0.7 g, 0.8 g, 0.9 g, 1.0 g, 1.2 g, 1.3 g, 1.4 g, 1.5 g, 1.6 g, 1.7 g, 1.8 g, 1.9 g, 2.0 g, 2.1 g, 2.2 g, 2.3 g, 2.4 g, 2.5 g, 2.6 g, 2.7 g, 2.8 g, 2.9 g, 3.0 g, or greater. In accordance with the exemplary embodiment of FIGS. 1-9, the tipping threshold is at least about 1.5 g.

A three-wheeled vehicle's rollover stability may also be enhanced by increasing the vehicle's track width. In accordance with the present disclosure, a three-wheeled vehicle may be provided having a track width that is at least about 3 times the vehicle's center of gravity height. For example, the track width may be between about 3 to 7 times the vehicle's center of gravity height, about 4 to 6 times the vehicle's center of gravity height, or about 4.5 to 5.5 times the vehicle's center of gravity height. In the exemplary embodiment of FIGS. 1-9, a three-wheeled vehicle is provided having a track width of about 4.9 to 5.1 times the vehicle's center of gravity height.

In some embodiments, a three-wheeled vehicle may be provided in accordance with the present disclosure that has a track width of between about 40 to 100 inches, between about 40 to 45 inches, between about 45 to 50 inches, between about 50 to 55, between about 55 to 60 inches, between about 60 to 65 inches, between about 65 to 70 inches, between about 70 to 75 inches, between about 75 to 80 inches, between about 80 to 85 inches, between about 85 to 90 inches, between about 90 to 95 inches, between about 95 to 100 inches, or any intermediate distance. The exemplary embodiment of FIGS. 1-9, has a track width of about 81 inches; however, three-wheeled vehicles having a track of virtually any width may be provided as taught in accordance with the present disclosure, without departing from the spirit and scope hereof.

Lateral Stability
Oversteer/Understeer Characteristics

Lateral stability of a vehicle may be characterized by its behavior during a turn under steady-state conditions. An example of a steady-state turn is a vehicle negotiating a curve with constant radius at constant forward speed. When a vehicle is negotiating a turn at moderate or high speeds, the effect of the centrifugal force acting on the vehicle's center of gravity produces a side-force acting on the tires of the vehicle. This side force may be characterized by a slip angle $\alpha$, which is the angle formed between the direction of wheel travel and the direction towards which the wheel is pointing. The slip angle is formed due to the deformation of the tire as it moves through the contact patch with the driving surface. It is this deformation that gives rise to the lateral tire forces that allow for turning.

The relationship between the slip angles of the front and rear tires, $a_f$ and $a_r$, respectively, will determine a vehicle's behavior in a turn. The slip angles of the front and rear wheels can be established as:

$$a_f = W_f v^2 / (C_{af} g R) \qquad (4)$$

and $$a_r = W_r v^2 / (C_{ar} g R) \qquad (5)$$

where $W_f$ is the load on the front axle, $W_r$ is the load on the rear axle, v is the forward speed of the vehicle, $C_{af}$ is the cornering stiffness of the front tires, $C_{ar}$ is the cornering stiffness of the rear tire, and R is the radius of the turn. Further, the steering angle of the front wheels $\delta$ required to complete a turn of a known radius under a given acceleration, in light of the respective slip angles of the front and rear wheels, is provided by the equation:

$$\delta = 57.3 \frac{L}{R} + \alpha_f - \alpha_r \qquad (6)$$

The prime factors controlling the steady-state handling characteristics of a vehicle during cornering are the weight distribution of the vehicle and the cornering stiffness of the tires. This is evident from the component $[W_f/C_{af} - W_r/C_{ar}]$ within equation (6), which represents the difference between the respective ratio of the load on the axle to the cornering stiffness of the tires on the axle, for the front and rear axles. This difference in ratios is called the "understeer gradient," and will be denoted by the symbol, K. Understeer gradient K may also be measured empirically using open loop test methods for steady-state circular driving behavior, for example, as set forth in ISO standard 4138:2012. The open-loop maneuvers included in these methods are not representative of real driving conditions, but are nevertheless useful for obtaining measures of vehicle steady-state behavior resulting from several specific types of control inputs under closely controlled test conditions.

A vehicle's steady-state handling characteristics may be classified into one of three categories depending on the value of the understeer gradient (i.e., the relationship between the slip angles of the front and rear tires): neutral steer, understeer, and oversteer.

When the understeer gradient is zero, which means the slip angles of the front and rear tires are equal (i.e., $a_f = a_r$ and $W_f/C_{af} = W_r/C_{ar}$), the vehicle is said to have neutral steering, meaning that the steering angle $\delta$ required to negotiate a given curve of constant radius is independent of forward speed. The neutral steer situation corresponds to a balance of the vehicle such that the force of the lateral acceleration at the vehicle's center of gravity causes an identical increase in slip angle at both the front and rear wheels.

When the understeer gradient is greater than zero (i.e., $a_f > a_r$ and $W_f/C_{af} > W_r/C_{ar}$), the vehicle is said to "understeer," because the steering angle required to negotiate a given curve increases with the square of the vehicle's forward speed. With understeer conditions, the vehicle steers less than the amount commanded by the steering angle provided by the driver. Thus, for an understeer vehicle accelerating in a constant radius turn, the steering angle must be increased to maintain the radius of the turn; otherwise, the understeer vehicle will drift to the outside of the turn. In other words, when an understeer vehicle is accelerated with the steering wheel fixed at a given steering angle, the turning radius of the vehicle increases. At the same steering wheel position and vehicle forward speed, the turning radius of an understeer vehicle is larger than that of a neutral steer vehicle.

When the understeer gradient is less than zero (i.e., $a_f < a_r$ and $W_f/C_{af} < W_r/C_{ar}$), the vehicle is said to "oversteer," because the steering angle required to negotiate a given curve decreases with the increase of the vehicle's forward speed. With oversteer conditions, the vehicle steers more than the amount commanded by the steering angle provided by the driver. Therefore, a driver must compensate for oversteer when accelerating in a constant radius turn by reducing the steering angle of the front wheels; otherwise, the oversteer vehicle will veer towards the inside of the turn. When an oversteer vehicle is accelerated with the steering wheel fixed at a given steering angle, the turning radius of the vehicle decreases. At the same steering wheel position and vehicle forward speed, the turning radius of an oversteer vehicle is less than that of a neutral steer vehicle. During severe oversteer, a vehicle may "spin-out."

A vehicle that understeers is considered safer in the hands of the average driver. When an understeer vehicle is taken to frictional limits where it is no longer possible to increase lateral acceleration, the vehicle will follow a path with a radius larger than intended. Although the vehicle cannot increase lateral acceleration, it is dynamically stable. Conversely, when an oversteer vehicle is taken to frictional limits, it becomes dynamically unstable with a tendency to spin-out. Although a skilled driver may be able to maintain control of an oversteer vehicle slightly past the point of instability with counter-steering, at some limit in lateral acceleration, spin-out will occur. Consequently, vehicles for the average driver are typically designed with some degree of understeer. Yet, drivers seeking a high performance vehicle may prefer some degree of oversteer in favor of a more responsive feel.

Given the relationship between axle load and slip angle, in general, a vehicle that is heavier at the front will tend to exhibit understeer characteristics, and a vehicle that is heavier at the rear will tend to exhibit oversteer characteristics. Similarly, a vehicle having an even weight distribution between the front and rear axles will tend to exhibit neutral steer characteristics.

The relationship between weight distribution and understeer/oversteer characteristics may be characterized by the yaw response resulting from a lateral force applied at the vehicle's center of gravity under no steering. One may expect the existence of a point in the longitudinal plane where a lateral force acting at that point does not cause any steady-state yaw motion, but rather, only causes the vehicle to drift side-ways. This point is referred to as the neutral-steer point, and has a position relative to the vehicle's center of gravity. The distance from the location of the vehicle's longitudinal center of gravity rearward to the neutral-steer point divided by the wheelbase is termed "static margin."

The value of a vehicle's static margin can be positive, negative, or zero. This static margin value is an indicator of the yaw response of the vehicle resulting from a lateral force applied at the vehicle's center of gravity under no steering. When a vehicle's center of gravity is located forward of the vehicle's neutral-steer point, the yaw response will generate a front slip angle that is larger than the rear slip angle, resulting in the vehicle exhibiting understeer characteristics. When a vehicle's center of gravity is located rearward of the vehicle's neutral-steer point, the yaw response will generate a rear slip angle that is larger than the front slip angle, resulting in the vehicle exhibiting oversteer characteristics. When the neutral-steer point coincides with a vehicle's center of gravity, a lateral force applied at that point will not generate any yaw response.

The static margin of a three-wheeled vehicle may be characterized under linear conditions as:

$$SM = \frac{C_{ar}}{2C_{ar} + C_{ar}} - \frac{CG_l}{L} \quad (7)$$

If the cornering stiffness of the front tires and the rear tires are presumed to be equal, then the static margin can be reduced to:

$$SM = \frac{1}{3} - \frac{CG_l}{L} \quad (8)$$

and the corresponding longitudinal center of gravity where SM=0 would be:

$$CG_l = L/3 \quad (9)$$

As the vehicle's center of gravity moves forward of the neutral-steer point, then SM and K would both become positive.

It is understood, however, that the static margin SM derived from equation (8) as well as the understeer gradient K derived from equation (6) presume linear conditions, which depends on constant cornering stiffness for small slip angles; but that under non-linear conditions, as the lateral acceleration increases, the lateral tire forces must also increase, which causes the relationship between lateral force and slip angle to move beyond the linear range. Also, with increasing lateral force, weight is transferred laterally across vehicle in the direction of the lateral force, which introduces load sensitivity effects, such that the total cornering stiffness of two tires on an axle would be less than the sum of their statically loaded values as is assumed under linear conditions. Further, for a three-wheeled vehicle, only the front wheels experience lateral weight transfer, and as such, only the total front stiffness value would decrease from the statically loaded value. The components making up K, the understeer gradient, namely $[W_f/C_{af} - W_r/C_{ar}]$, show that a decrease in total front stiffness will increase the understeer gradient as lateral acceleration increases.

In accordance with the present disclosure, a three-wheeled vehicle may be provided having a static margin SM of less than zero, as calculated by equation (5). Such a static margin corresponds to a longitudinal center of gravity $CG_l$ located at a distance rearward from the axis defined by the centerline of the front wheels that is more than ⅓ of the wheelbase of the vehicle L. Such a static margin also corresponds to a three-wheeled vehicle having greater than ⅓ of the total vehicle weight on the rear wheel. In some embodiments, a three-wheeled vehicle in accordance with the present disclosure may have a static margin SM of less than zero, yet the vehicle may nevertheless exhibit oversteer characteristics under certain operating conditions, such as when increasing lateral force results in a corresponding lateral weight transfer, which may be effective to increase the vehicle's the understeer gradient. In some embodiments, oversteer characteristics may be reduced and/or transitioned to understeer characteristics, with increasing lateral force.

Accordingly, in some embodiments a three-wheeled vehicle is provided that exhibits handling characteristics representative of an increasing understeer gradient as lateral force increases. In some embodiments, a three-wheeled vehicle is provided in which, under at least one condition of steady-state operation, the understeer gradient is less than zero, for example from about −5 degrees/g to −0.001 degrees/g, from about −2.5 degrees/g to −0.001 degrees/g, or from about −1.0 degrees/g to −0.001 degrees/g. In some embodiments, a three-wheeled vehicle is provided wherein under at least one condition of steady-state operation, the understeer gradient is greater than zero, for example, from about +0.001 degrees/g to +10.0 degrees/g, from about +1.0 degrees/g to +7.0 degrees/g, or from about +0.5 degrees/g to +2.5 degrees/g. Under some steady-state conditions, the understeer gradient in accordance with the present disclosure may be about −5.0 degrees/g, −4.75 degrees/g, −4.5 degrees/g, −4.25 degrees/g, −4.0 degrees/g, −3.75 degrees/g, −3.5 degrees/g, −3.25 degrees/g, −3.0 degrees/g, −2.75 degrees/g, −2.5 degrees/g, −2.25 degrees/g, −2.0 degrees/g, −1.75 degrees/g, −1.5 degrees/g, −1.25 degrees/g, −1.0 degrees/g, −0.75 degrees/g, −0.5 degrees/g, −0.25 degrees/g, 0.0 degrees/g, +0.25 degrees/g, +0.5 degrees/g, +0.75 degrees/g, +1.0 degrees/g, +1.25 degrees/g, +1.5 degrees/g, +1.75 degrees/g, +2.0 degrees/g, +2.25 degrees/g, +2.5 degrees/g, +2.75 degrees/g, +3.0 degrees/g, +3.25 degrees/g, +3.5 degrees/g, +3.75 degrees/g, +4.0 degrees/g, +4.25 degrees/g, +4.5 degrees/g, +4.75 degrees/g, +5.0 degrees/g, +5.25 degrees/g, +5.5 degrees/g, +5.75 degrees/g, +6.0 degrees/g, +6.25 degrees/g, +6.5 degrees/g, +6.75 degrees/g, +7.0 degrees/g, +7.25 degrees/g, +7.5 degrees/g, +7.75 degrees/g, +8.0 degrees/g, +8.25 degrees/g, +8.5 degrees/g, +8.75 degrees/g, +9.0 degrees/g, +9.25 degrees/g, +9.5 degrees/g, +9.75 degrees/g, +10.0 degrees/g, or any intermediate value.

In some embodiments, a three-wheeled vehicle is provided which exhibits an understeer gradient that increases over a range of increasing lateral force. For example, the understeer gradient may increase over a range of operating conditions defined by a first lateral force and a second lateral force, such that at the first lateral force the understeer gradient has a value of less than zero and at the second lateral force the understeer gradient has a value of greater than zero. The understeer gradient transitions between the first value and the second value along a curve defining understeer gradient as a function of lateral force, with the understeer gradient increasing with increasing lateral force. For example, under a first lateral force, the understeer gradient may be less than about −5.0 degrees/g, −4.75 degrees/g, −4.5 degrees/g, −4.25 degrees/g, −4.0 degrees/g, -3.75 degrees/g, −3.5 degrees/g, −3.25 degrees/g, −3.0 degrees/g, −2.75 degrees/g, −2.5 degrees/g, −2.25 degrees/g, −2.0 degrees/g, −1.75 degrees/g, −1.5 degrees/g, −1.25 degrees/g, −1.0 degrees/g, −0.75 degrees/g, −0.5 degrees/g, −0.25 degrees/g, or any intermediate value; and under a second lateral force which exceeds the first lateral force, the understeer gradient may be greater than about +0.25 degrees/g, +0.5 degrees/g, +0.75 degrees/g, +1.0 degrees/g, +1.25 degrees/g, +1.5 degrees/g, +1.75 degrees/g, +2.0 degrees/g, +2.25 degrees/g, +2.5 degrees/g, +2.75 degrees/g, +3.0 degrees/g, +3.25 degrees/g, +3.5 degrees/g, +3.75 degrees/g, +4.0 degrees/g, +4.25 degrees/g, +4.5 degrees/g, +4.75 degrees/g, +5.0 degrees/g, +5.25 degrees/g, +5.5 degrees/g, +5.75 degrees/g, +6.0 degrees/g, +6.25 degrees/g, +6.5 degrees/g, +6.75 degrees/g, +7.0 degrees/g, +7.25 degrees/g, +7.5 degrees/g, +7.75 degrees/g, +8.0 degrees/g, +8.25 degrees/g, +8.5 degrees/g, +8.75 degrees/g, +9.0 degrees/g, +9.25 degrees/g, +9.5 degrees/g, +9.75 degrees/g, +10.0 degrees/g, or any intermediate value. The understeer gradient may likewise have a third value located anywhere along the curve between the first value and the second value.

The curve defining understeer gradient as a function of may exhibit virtually any desired ramp rate. For example, understeer gradient may increase at a desired rate linearly, or the rate of increase may change with increasing lateral force, for example, according to a multiple of lateral force. Such an understeer gradient curve may be effected by selecting tires with a desired cornering stiffness, suspension configurations with a desired leverage rate, and/or desired suspension tuning settings (e.g., compression and damping) so as to achieve the lateral weight transfer needed to effect the corresponding change in understeer gradient.

In accordance with the present disclosure, a three-wheeled vehicle may be provided wherein the static margin is zero, less than zero, or greater than zero. For example, the static margin may be between about −0.170 to +0.150, between about 0.0 to +0.133, about 0.0 to −0.167, about 0.0 to −0.0042, or about −0.042 to −0.167. In some embodiments, the static margin may be between about −0.017 to −0.067, for example, less than about −0.017, −0.027, −0.037, −0.047, −0.057, −0.067, any intermediate value, or less.

In some embodiments, a three-wheeled vehicle is provided having a static margin greater than zero, and which vehicle exhibits understeer characteristics under at least one condition of steady-state operation. In some embodiments, understeer characteristics are exhibited over a range of operating conditions defined by a range of lateral force, such that the vehicle exhibits oversteer characteristics at a first lateral force that is less than a threshold lateral force and the vehicle exhibits understeer characteristics at a second lateral force that is greater than the threshold lateral force. In some embodiments, the magnitude of the understeer characteristics of the vehicle increase with increasing lateral force. For example, in accordance with the present disclosure, a three-wheeled vehicle may be provided wherein the static margin is greater than zero, and the understeer gradient is greater than zero under at least one condition of steady-state operation.

In accordance with the exemplary embodiment of FIGS. 1-9, the wheelbase is about 96 inches and the longitudinal center of gravity, as measured rearwards from the axis defined by the centerline of the front wheels, is about 36 inches. Accordingly, the static margin for the exemplary embodiment of FIGS. 1-9 is about −0.042, as calculated using equation (8).

Although the inherent understeer/oversteer characteristics of a vehicle depend on weight distribution, many properties of a vehicle may affect the understeer gradient, including tire cornering stiffness, camber thrust, lateral force compliance steer, self-aligning torque, lateral load transfer, and compliance in the steering system. These individual contributions can be identified analytically or by measurement in a Bundorf analysis, which is known in the art. Accordingly, the design of a vehicle's suspension systems and the selection of wheels and tires can enhance or moderate understeer/oversteer characteristics. Further, vehicles are inherently nonlinear systems, and it is normal for the understeer gradient K to vary over a range of operating conditions. For example, it is possible for a vehicle to exhibit understeer characteristics in some conditions and oversteer characteristics in others.

Moment of Inertia

In addition to understeer/oversteer characteristics, the lateral stability of a vehicle may also be characterized by the vehicle's resistance to rotational inertia. Moment of inertia is a mass property that determines the torque needed for a desired angular acceleration about an axis of rotation. Rotation about the vertical axis is commonly referred to as the polar moment of inertia, but will be referred to herein simply as moment of inertia. A vehicle's moment of inertia determines the lateral force required to produce a given slip angle to change the vehicles' direction of travel. In other words, a vehicles' moment of inertia defines how quickly a vehicle will react to a turn of the steering wheel.

A vehicle's moment of inertia depends on the amount and distribution of its mass, and may be measured using methods known in the art. For example, the National Highway Traffic Safety Administration of the US Department of Transportation performs testing on vehicles in a laboratory equipped with a turntable assembly configured to measure moment of inertia. Vehicle inertia measuring machines and testing services are also commercially available, for example, from CFM-ITBONA LLC, Spring Park, Minn., and from S-E-A Limited, Columbus, Ohio. Alternatively, moment of inertia may be quantified through the sum of moments of inertia of the masses making up the whole vehicle. In some instances, it may be unnecessary to quantify a vehicle's overall moment of inertia, but rather relative changes to moment of inertia may be quantified by comparing changes to the moment of inertia of a component part when the part is moved to an alternative location of the vehicle.

As a vehicle's moment of inertia increases, the lateral force required to initiate a given yaw acceleration increases. Thus, a vehicle will exhibit an increasing resistance to changing direction with increasing moment of inertia. As such, a vehicle tends to be more stable, and react slower to steering inputs, with increasing moment of inertia. For example, with increasing moment of inertia, a driver may be afforded increasingly more time to recognize and respond to driving conditions, such as to correct an oversteer event, yet more time also is required before a vehicle will respond to the driver's steering corrections. Conversely, a vehicle tends to be less stable, and more sensitive to steering inputs as the vehicle's moment of inertia decreases. Yet in some embodiments, a lower moment of inertia may provide for a vehicle having more responsive steering and enhanced maneuverability.

The moment of inertia I for a given component within a vehicle may be calculated as:

$$I = md^2 \qquad (10)$$

where m is the mass of the component, and d is the longitudinal distance of the moment arm acting about the vehicle's neutral-steer point. The neutral-steer point of a vehicle is the point on the plane of symmetry at which an external lateral force will produce no steady-state yaw acceleration. The vehicle's neutral-steer point NSP, thus can be derived from the threshold condition where SM=0, and accordingly from equation (8):

$$NSP = L/3 \qquad (11)$$

It is understood that with a three-wheeled vehicle, the neutral-steer point may be located further towards the axis defined by the centerline of the front wheels than indicated by equation (8) due to load sensitivities discussed above. As such, empirical testing as discussed above may be useful in determining a vehicle's true neutral-steer point.

A vehicle's moment of inertia may be modified by changing the location of masses throughout the vehicle. Concentrating the mass of a vehicle around the neutral-steer point reduces the vehicle's moment of inertia, whereas moving mass forward or rearward from the neutral-steer point increases moment of inertia.

Relocating heavy items such as the engine, batteries, fuel tank, location of passengers, and the like typically has the largest effect on a vehicle's moment of inertia; however, because moment of inertia depends on the squared distance of an object from the axis of rotation, the location of an object tends to have a greater effect on its moment than the object's mass. In some embodiments, mass (e.g., heavy items such as the engine, batteries, fuel tank, location of passengers) may be concentrated around the vehicle's center of gravity to mitigate the effect of the mass on the vehicle's moment of inertia. For example, a mid-engine configuration generally has a smaller moment of inertia than a vehicle with a front engine or rear engine configuration, because with a mid-engine configuration, more of the vehicle's mass is concentrated around the vehicle's center of gravity and/or neutral-steer point.

A three-wheeled vehicle's moment of inertia may also be modified by changing its wheelbase. When the wheelbase is extended, moment of inertia typically increases due to aspects of the vehicle thereby being located further from the vehicle's neutral-steer point. Conversely, when the wheelbase is shortened, the vehicle's mass is typically concentrated around the vehicle's center of gravity, thereby reducing its moment of inertia.

While the lateral stability of a three-wheeled vehicle may be enhanced by shifting the longitudinal center of gravity towards the front axle, changes to the vehicle's center of gravity also impact moment of inertia. In some embodiments, a three-wheeled vehicle having a center of gravity that is too close to the front axle may have a suboptimum moment of inertia, reflected either by an overly weighted front axle that is slow to initiate turns, and/or an underly weighted rear axle that lacks sufficient lateral load to generate adequate traction. In accordance with the present disclosure, however, moment of inertia and center of gravity are configured with a view towards their interrelated effect on vehicle handling characteristics.

In some embodiments, a three-wheeled vehicle may exhibit a rearward-biased moment of inertia. The vehicle's moment of inertia may differ between the portion of the vehicle forward of the neutral steer point and the portion of the vehicle rearward of the neutral steer point. Even if a three-wheeled vehicle's center of gravity coincides directly with its neutral steer point, the vehicle's moment of inertia forward of the neutral steer point may nevertheless differ from the moment of inertia rearward of the neutral-steer point. For example, a front-engine or front mid-engine three-wheeled vehicle may exhibit a larger moment of inertia forward of the vehicle's neutral-steer point relative to the vehicle's rearward moment of inertia. Conversely, when an engine in a three-wheeled vehicle is located rearward of the cockpit, for example in a rear mid-engine configuration, the vehicle may exhibit a rearward moment of inertia that is larger than the vehicle's frontward moment of inertia. In other words, moment of inertia may be frontward-biased or rearward-biased.

The handling characteristics of a three-wheeled vehicle may be enhanced, in accordance with the present disclosure, by reducing the vehicle's frontward moment of inertia and increasing the vehicle's rearward moment of inertia. This may be accomplished by shifting the vehicle's center of gravity rearward to a distance rearward from the axis defined by the centerline of the front wheels that is more than 1/3 of the wheelbase of the vehicle in accordance with the present disclosure. Additionally or in the alternative, a three-wheeled vehicle's frontward moment of inertia may be decreased, and/or, the rearward moment of inertia increased, by reducing the distance between the vehicle's neutral-steer point and a given mass frontward of the neutral-steer point, and by increasing the distance between the vehicle's neutral-steer point and a given mass rearward of the neutral-steer point. In some embodiments, a rearward-biased moment of inertia may be effected by positioning components of the vehicle having a relatively high concentration of mass (e.g., an engine, and/or, for an electric vehicle or hybrid-electric vehicle, one or more batteries) at a location rearward of the vehicle's neutral-steer point. For example, as compared to a front-engine or front mid-engine three-wheeled vehicle, a rear mid-engine configuration in accordance with the present disclosure decreases the moment of inertia frontward of the vehicle's neutral-steer point and increases the moment of inertia rearward of the vehicle's neutral-steer point.

Such a rearward-biased moment of inertia can enhance vehicle handling effects. During the initial transition into a turn, a vehicle's front tires generate torque about the vehicle's vertical axis that initiates the vehicle rotating into the turn. The slip angle of the vehicle's front tires also generates a lateral force, as discussed above. This lateral force, however, acts opposite to the torque about the vehicle's vertical axis, and resists the initiation of the turn. The vehicle's moment of inertia must be overcome before the vehicle will begin to turn, and as a consequence, the vehicle may tend to understeer on initial corner entry.

By providing a three-wheeled vehicle having a rearward-biased moment of inertia, the vehicle may more easily initiate a turn, thereby reducing understeer tendencies. This is because the front wheels have a smaller moment of inertia to overcome owing to the rearward-bias. A rearward-biased moment of inertia also enhances handling by providing an enhanced threshold force required to overcome the vehicle's rearward moment of inertia and, for example, cause the vehicle to spin-out. Additionally, a rearward-biased moment of inertia may allow for easier recover from oversteer and/or spin-outs because the lower frontward moment of inertia may enable the vehicle to quickly respond to decreased steering angle and/or counter-steering. Thus, in some embodiments in accordance with the present disclosure, a three-wheeled vehicle is provided having enhanced handling characteristics, including enhanced cornering ability, reduced tendency to spin-out, and easier recovery from oversteer and/or spin-out events. By contrast, a three-wheeled vehicle having a high frontward moment of inertia may not respond quickly to steering, and thus may tend to understeer. As such, a front-engine three-wheeled vehicle may be slow to initiate corner entry, prone to spin out, and/or slow to recover from oversteer and/or spin-out events.

Although a high moment of inertia may slow a vehicle's response to an oversteer and/or spin-out event, in some embodiments a three-wheeled vehicle in accordance with the present disclosure is provided in which the vehicle transitions, in response to increasing lateral force as discussed above, from understeer characteristics to oversteer characteristics. The threshold level of lateral force effective to cause the vehicle to transition from oversteer characteristics to understeer characteristics may be selected based on the desired handling characteristics of the vehicle. For example, the rearward-biased moment of inertia may be configured such that the lateral force required to effect a spin-out exceeds the selected threshold for the transition to understeer characteristics, thereby rendering the vehicle laterally stable before any such spin-out would occur.

In some embodiments, a three-wheeled vehicle may be provided having some degree of oversteer characteristics (which may be preferred by drivers seeking high performance cornering), yet such vehicle may be configured in accordance with the present disclosure so as to safely transition from understeer characteristics to stable oversteer characteristics as the lateral force exerted upon the vehicle approaches a specified threshold of lateral force. The specified threshold of lateral force may be, for example, a fraction of the lateral force sufficient to effect a spin out, thereby availing average drivers of some of the advantages of an understeer vehicle while providing some level of safety associated with stable understeer characteristics during conditions such as high speed and/or high lateral acceleration which may render oversteer characteristics unsafe for the average driver.

Various features of the three-wheeled vehicles disclosed herein may be configured to reduce the moment of inertia of the vehicle. In some embodiments, three-wheeled vehicles may be provided that have a rearward-biased moment of inertia (i.e., a frontward moment of inertia that is less than the rearward moment of inertia). The cockpit configuration disclosed herein allows frontward aspects of the vehicle to be drawn closer towards the vehicles' neutral steer point and center of gravity, while maintaining adequate leg-room for the vehicle's occupants. The rear mid-engine configuration disclosed herein provides for a greater moment of inertia relative to a front-engine or front mid-engine configuration.

In some embodiments, the rear mid-engine configuration disclosed herein may be effective to provide a rearward-biased moment of inertia, such that the sum of moments of inertia for all aspects of the vehicle and payload located rearward of the vehicle's neutral-steer point that are equal to or greater than the sum of moments of inertia for all aspects of the vehicle and payload located forward of the vehicle's neutral-steer point. Payload may include a driver, one or more optional passengers, cargo, and fuel. For example, the sum of moments of inertia for all aspects of the vehicle and payload located rearward of the vehicle's neutral-steer point may be between about 100% to 150% or more of the sum of moments of inertia for all aspects of the vehicle and payload forward of the vehicle's neutral-steer point. The sum of moments of inertia rearward of the vehicle's neutral-steer point may exceed the forward sum of moments of inertia by about 0% to 10%, about 10% to 20%, by about 30% to 40%, by about 40% to 50%, or more, and any intermediate percentage.

In other embodiments, the sum of moments of inertia forward of the vehicle's neutral-steer point may exceed the sum of moments of inertia rearward of the neutral-steer point, yet the contribution to rearward moment of inertia by the vehicle's rear mid-engine configuration may nevertheless be effective to enhance the vehicle's handling characteristics.

III. Other Embodiments

The foregoing detailed description of exemplary embodiments has set forth various embodiments of three-wheeled vehicles. While the three-wheeled vehicles disclosed herein are characterized by two front wheels and a single rear wheel, it will be apparent that numerous aspects disclosed herein also apply to three-wheeled vehicles having a single front wheel, as well as to vehicles having four or more wheels. While various aspects and embodiments have been disclosed herein, other aspects and embodiments will be apparent to those skilled in the art. The various aspects and embodiments disclosed herein are for purposes of illustration and are not intended to be limiting. It is intended that the scope of this disclosure be defined by the following claims and their equivalents:

What is claimed is:

1. A vehicle comprising:
   two front wheels and a single rear wheel coupled to a frame;
   a cockpit provided within the frame, the cockpit configured to accommodate seating for one or more occupants;
   front axle shafts coupled to each of the front wheels, the front axle shafts laterally traversing the frame, inside the cockpit, at an elevation above at least one aspect of the surface of said seating; and
   one or more elevated floorboards providing separation from the front axle shafts for the one or more occupants.

2. The vehicle of claim 1, further comprising one or more tie rods coupled to each of the front wheels, the tie rods laterally traversing the frame, inside the cockpit, beneath the one or more elevated floorboards.

3. The vehicle of claim 1, further comprising one or more of the following located at least in part at an elevation above the at least one aspect of the surface of said seating: a gas pedal, a brake pedal, and a clutch pedal.

4. The vehicle of claim 1, further comprising one or more of the following at least partially located inside the cockpit at an elevation below a point on the one or more elevated floorboards: a transmission, a drive shaft, and a differential.

5. The vehicle of claim 1, further comprising an engine positioned at least partially rearward of the longitudinal center of gravity of the vehicle.

6. The vehicle of claim 5, wherein the engine provides an output power of at least 100 HP.

7. The vehicle of claim 1, wherein the longitudinal center of gravity of the vehicle is located a distance rearward from the axis defined by the centerline of the front wheels that is from 37.5% to 38.5% of the vehicle's wheelbase.

8. The vehicle of claim 1, wherein the longitudinal center of gravity of the vehicle is from 34 to 38 inches rearward from the axis defined by the centerline of the front wheels.

9. The vehicle of claim 1, wherein the wheelbase of the vehicle is from 84 to 120 inches.

10. The vehicle of claim 1, wherein the center of gravity height of the vehicle is from 15 to about 18 inches.

11. The vehicle of claim 1, wherein the track width of the vehicle is from 3 to 7 times the vehicle's center of gravity height.

12. The vehicle of claim 1, wherein the tipping threshold of the vehicle, as defined by a static stability factor, is at least 1.4 g.

13. A vehicle comprising:
   two front wheels and a single rear wheel coupled to a frame;
   an engine, and a plurality of drivetrain components configured to supply power from the engine to at least some of the wheels, the drivetrain components comprising at least a drive shaft; and
   a cockpit provided within the frame, the cockpit comprising one or more elevated floorboards configured to separate a person seated in the cockpit from at least some drivetrain components located inside the cockpit;
   wherein the cockpit is configured to seat the person in an orientation such that: (a) the person's lower legs intersect the longitudinal position of the axis defined by the centerline of the front wheels, and (b) at least a portion of the person's body intersects the elevation of the axis defined by the centerline of the drive shaft.

14. The vehicle of claim 13, wherein when seated in said orientation, the person's upper legs intersect the elevation of the axis defined by the centerline of the front wheels and/or the elevation of the axis defined by the centerline of the drive shaft.

15. The vehicle of claim 13, wherein when seated in said orientation, at least a portion of the person's body intersects the elevation of a point on the surface of the one or more elevated floorboards.

16. The vehicle of claim 13, wherein when seated in said orientation, the longitudinal center of gravity of the vehicle intersects a point on one or more of the person's hips, midline, or torso.

17. The vehicle of claim 13, wherein when seated in said orientation, the center of gravity height of the vehicle is at an elevation above a point on one or more of the person's hips, midline, or torso.

18. The vehicle of claim 13, wherein when seated in said orientation, at least a portion of the person's lower legs are an at elevation above a point on the person's hips, midline, or torso.

19. The vehicle of claim 13, further comprising one or more of the following pedals: a gas pedal, a brake pedal, and a clutch pedal; and
   wherein when seated in said orientation, at least a portion of the person's hips, midline, or torso are at an elevation below the elevation of a point on one of said one or more pedals.

20. The vehicle of claim 19, wherein when seated in said orientation, the one or more elevated floorboards are configured to receive the person's lower legs, at least one aspect of the floorboard aligning substantially parallel with an expected position of the person's lower legs when extended to reach one or more of said one or more pedals.

21. The vehicle of claim 13, wherein the cockpit comprises a recumbent seat configurable to situate the person in said orientation.

22. The vehicle of claim 13, wherein the portion of the person's body comprises at least a portion of one or more of: the coccyx, the sacrum, the pelvis, and the femur.

23. The vehicle of claim 13, wherein the engine is positioned at least partially rearward of the longitudinal center of gravity of the vehicle.

24. The vehicle of claim 13, wherein the drivetrain components comprise one or more of: a transmission, a drive shaft, and a differential, and a front axle shaft.

25. The vehicle of claim 13, wherein the drivetrain components comprise front axle shafts coupled to each of the front wheels, the front axle shafts laterally traversing the cockpit beneath the one or more elevated floorboards.

26. The vehicle of claim 13, further comprising one or more tie rods coupled to each of the front wheels, the tie rods laterally traversing the cockpit beneath the one or more elevated floorboards.

* * * * *